United States Patent [19]

Linnermark et al.

[11] Patent Number: 5,471,526
[45] Date of Patent: Nov. 28, 1995

[54] TRACING WITH KEYS AND LOCKS ON A TELECOMMUNICATION NETWORK

[75] Inventors: Nils O. A. Linnermark, Trångsund; Karl U. Carlsson, Skarpnack, both of Sweden

[73] Assignee: Telefonaktiebolaget L M Ericsson (publ.), Stockholm, Sweden

[21] Appl. No.: 203,277

[22] Filed: Feb. 28, 1994

[51] Int. Cl.$^6$ ............................................ H04M 1/24
[52] U.S. Cl. ........................ 379/268; 379/1; 379/269; 380/4
[58] Field of Search ................................ 379/268, 269, 379/284, 220, 221, 265, 266, 1, 26; 380/4

[56] References Cited

U.S. PATENT DOCUMENTS

| | | | |
|---|---|---|---|
| 3,969,701 | 7/1976 | Hemdal | 379/269 |
| 4,002,851 | 1/1977 | Larsson | 379/284 |
| 4,439,830 | 3/1984 | Chueh | 364/200 |
| 4,464,543 | 8/1984 | Kline et al. | 379/224 |
| 4,756,019 | 7/1988 | Szybicki | 379/221 |
| 4,937,864 | 6/1990 | Caseiras et al. | 380/4 |
| 4,965,772 | 10/1990 | Daniel et al. | 364/900 |
| 5,023,907 | 6/1991 | Johnson et al. | 380/4 |
| 5,249,223 | 9/1993 | Vanacore | 379/221 |
| 5,359,649 | 10/1994 | Rosu et al. | 379/220 |

*Primary Examiner*—Jeffery A. Hofsass
*Assistant Examiner*—Scott Wolinsky
*Attorney, Agent, or Firm*—Jenkens & Gilchrist

[57] ABSTRACT

A method and apparatus for detecting events occurring in a telecommunications network is disclosed which comprises stored program control (SPC) exchanges, each SPC exchange comprising a switch and processors for executing software programs to control the switch. Code sequences, or daemons, are implanted in selected portions of the software programs, each code sequence including a conditional statement responsive to certain events and at least one activity resulting from the detection of a certain event satisfying the conditional statement. A lock value is assigned to each of the code sequences, each lock value uniquely identifying the corresponding code sequences and being operable to activate the processor for executing the code sequence. A key value is compared to each lock value for selectively activating the processor to execute the code sequence when the key value equals the lock value. The processor executes the activity specified in the code sequence if the detected event satisfies the conditional statement and continues execution of the software program whereby continuous-processing in the SPC exchange is maintained.

71 Claims, 11 Drawing Sheets

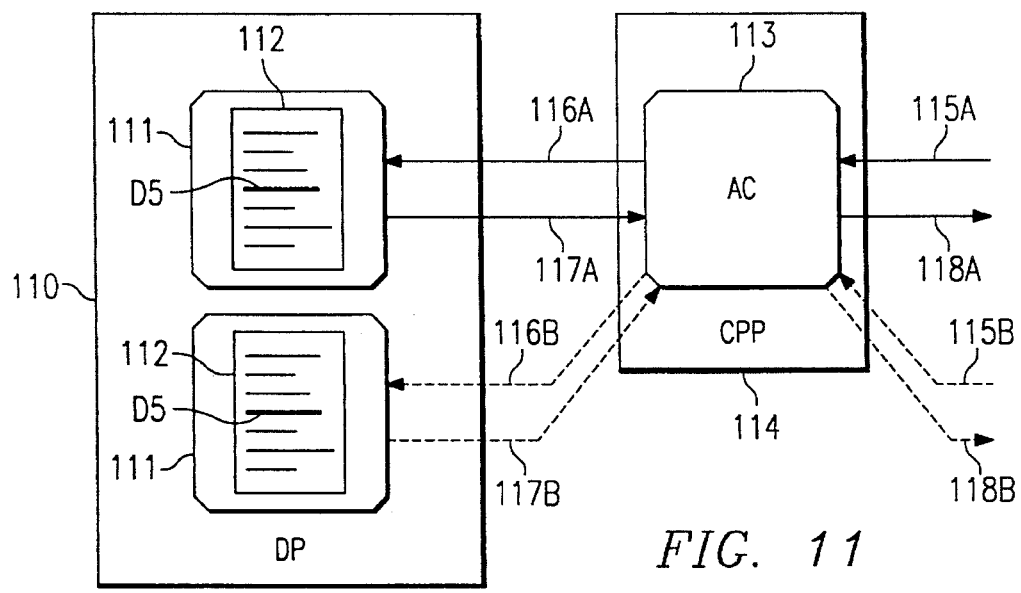
FIG. 11
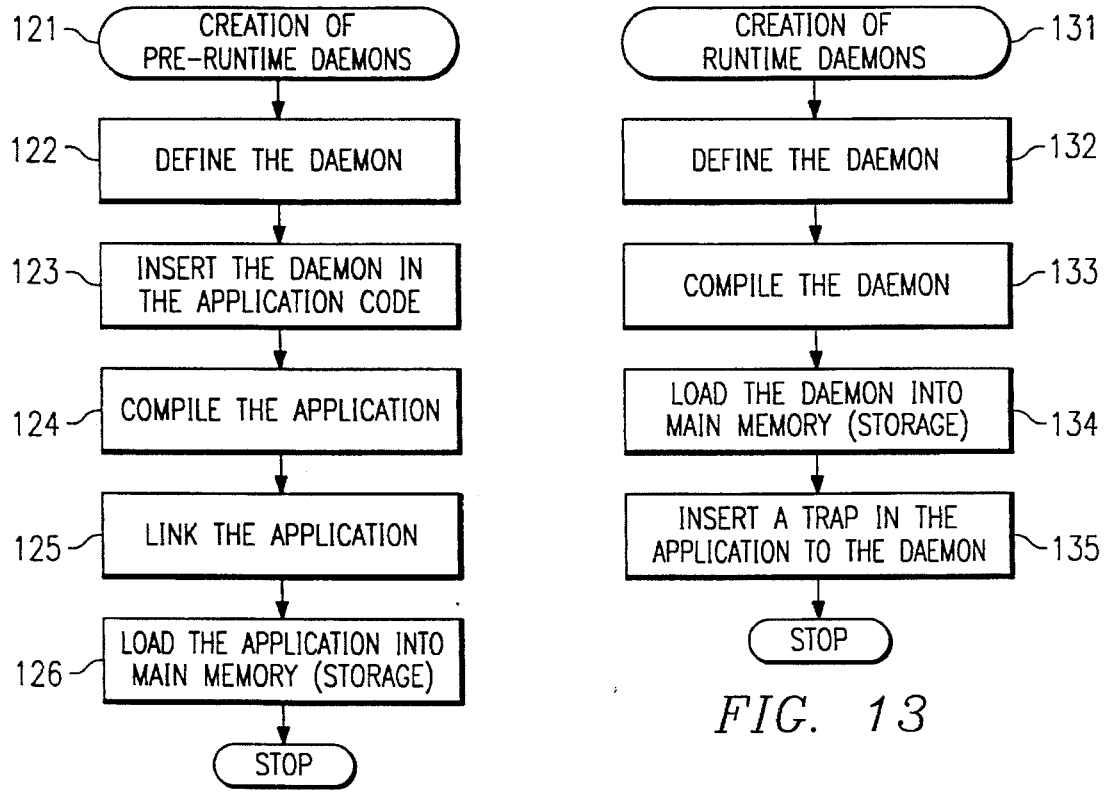
FIG. 12
FIG. 13

TRACING WITH KEYS AND LOCKS ON A TELECOMMUNICATION NETWORK

BACKGROUND OF THE INVENTION

A portion of the disclosure of this patent document contains material which is subject to copyright protection. The copyright owner has no objection to the facsimile reproduction by any one of the patent documents or the patent disclosure, as it appears in the patent and trademark office, patent file or records, but otherwise reserves all copyrights whatsoever.

1. Field of the Invention

The invention relates to a telecommunication network and, more particularly, software for tracing with keys and locks in a telecommunication network.

2. Description of Related Art

Telephone service today is provided to a multiplicity of customers or telephone subscribers through centralized switching. Referring to FIG. 1, a centralized switching machine in a central office 10 controls the switching of calls to and from local telephone subscribers 12 and communicates with other central offices 10 in the network via inter-office trunks 14. Each central office 10, and the subscribers 12 they serve, are linked to other regions by a toll office 16 via toll-connecting trucks 18 as well known in the industry. The central offices 10 can also be connected to customer dedicated switching equipment, such as for example, private automatic branch exchanges (PABX) 20 either directly by business trunks 22 or indirectly by inter-machine trunks 24. The PABX 20 connects other local telephone subscribers 12 to the network, as well as other user terminals such as, for example, computers 26 and facsimile machines (not shown). Such user terminals can also be connected to the central offices 10. The entire network identified generally at 28 in FIG. 1, or any portion thereof, is only one example of a telecommunications network.

Each switch at a central office 10 and toll office 16 and each PABX is typically a stored program control (SPC) exchange 30 including switching equipment 32 and a processor 34 for controlling the switching equipment 32 as shown in FIG. 2. The SPC exchange 30 is connected to the trunks through the switching equipment 32 which services the user terminals as described above. Each SPC exchange 30 must perform certain functions in handling a simple telephone call. For example, the SPC exchange 30 must monitor and sense that a subscriber desires service when the subscriber's telephone goes off-hook to originate a call. Once the SPC exchange 30 recognizes that an origination has taken place, i.e., detects the off-hook status of a given line, the SPC exchange 30 must connect to the trunks for notifying the subscriber, via a dial tone, for example, that the SPC exchange 30 is ready to receive information from the subscriber, and means for receiving this information. Information, e.g., the called number, is entered by the subscriber using a rotary dial or a touch-tone keypad and is received and recorded at the SPC exchange 30. This information must then be interpreted by the SPC exchange 30 to identify the locale of the called line.

If the called party and the calling party are served by the same central office, e.g., telephone subscribers 12(a) through central office 10(a), the call is an intra-office call. In such case, a busy test is made of the called line, and if the called line is idle, the called party is alerted, e.g., rung via an audible ring tone. The called line is supervised while awaiting an answer by the called party or abandonment by the calling party. If the called party answers, a speech path is established between the parties. The speech path is then supervised during conversation and is disconnected when one of the parties hangs up and the line goes on-hook.

If, on the other hand, the called party is served by a different central office, e.g., subscribers 12(a) and 12(b) through central offices 10(a) and 10(b), the call is an inter-office call. In this case, a search is made for an idle inter-office trunk 14 to the central office 10(b) which serves the called party or to the toll office 16 which is able to further the progress of the call to the central office 10(b) of the called party. Information about the called number is transmitted from the originating central office 10(a) and received by the toll office 16 which delivers the information to the terminating central office 10(b). If the called party's line is busy, or the call is blocked somewhere in the network, or the necessary intra-office trunks are all busy, the calling party is informed via an audible busy, fast busy or reorder tone.

The work to be performed by the SPC exchange 30 falls into two main categories: (1) the routine scanning of user terminals to detect changes, and (2) the complex analysis and diagnostics requiring high computing capacity and large volumes of data. An example of the first category is the checking performed to see if a subscriber 12 has lifted his handset off the telephone. This is done several times every second. Examples of the second category include the selection of ongoing routes or various traffic measurements. As indicated by the examples, the SPC exchange 30 is designed to be responsive to certain events which can be either external, e.g., when a subscriber lifts his handset off-hook, or internal, e.g., instruction steps in the software of the processor 34. The processor's 34 software performs many tasks, including those identified above, which are initiated by a software signal or software message, i.e., a software instruction including relevant data unique to the task. Software signals or software messages can be traced as part of the diagnostics being performed by the SPC exchange 30. When an individual orders the tracing of a software signal, the signal including its data is stored every time the signal is sent for later analysis. Obviously, signal tracing over a long period of time must be avoided, especially during heavy traffic on the telecommunication network, to avoid overloading the capacity of the system.

Thus, a telecommunication network conducts many concurrent tasks in response to events by executing thousands of software instructions on a number of different processors, such as the processor 30 shown in FIG. 2, and storing thousands of software signals by signal tracing in order to detect faults in or debug the software. Because the traffic of the telecommunication network is persistent it requires a "continuous-processing" capability, i.e., the processors 34 cannot be shut down for any reason. As such, this continuous-processing system requires unique fault detection and debugging techniques. Techniques useful for other systems do not work in a telecommunication network. For example U.S. Pat. No. 4,937,864 granted on Jun. 26, 1990, discloses certain debugging techniques used for locating faults in a copier machine. However, this method can only be used when the copier is shut down and, therefore, would not work in a telecommunication network. Normal fault detection and debugging techniques are not suitable for use in a telecommunications network.

Even current tracing systems can be useless for detecting certain categories of faults. Current systems are not sensitive enough to detect a small number of instructions being executed on a processor because the tracing system cannot address certain short-lived threads of instructions between signals. When the fault causes a failure that occurs after a large number of instructions are executed, the same system is too sensitive because it needs to store a long-lasting thread of instructions which exceed the capacity of an SPC exchange. The method and system of the present invention overcome these and other disadvantages and provide enhanced tracing enabling examination of short-lived threads, while at the same time analyzing long-lasting threads containing a large volume of tracing information with little loss of storage capacity by selectively storing such information.

SUMMARY OF THE INVENTION

In one aspect, the invention relates to discarding irrelevant tracing information to reduce the amount of storage required. Because the storage requirements are reduced, it is possible to view all messages in a trace-thread and the execution of a dedicated program sequence showing the connection between the high-level, application software and the low-level, operating software to solve difficult problems.

This also overcomes the problems associated with many users conducting traces simultaneously. Many users can conduct traces over many different processors without disturbing each other. The invention can also be used to invoke break points for a source-code debugger. The invention could be used to debug a trace-thread at the first phase of the integration test, or to use the trace mechanisms to detect particular events related to certain failures, or identify faults located between high-level and low-level programs.

In another more specific aspect, the invention relates to a method and apparatus for detecting events occurring in a telecommunications network is disclosed which comprises stored program control (SPC) exchanges, each SPC exchange comprising a switch and processors for executing software programs to control the switch. Code sequences, or daemons, are implanted in selected portions of the software programs, each code sequence including a conditional statement responsive to certain events and at least one activity resulting from the detection of a certain event satisfying the conditional statement. A lock value is assigned to each of the code sequences, each lock value uniquely identifies the corresponding code sequences and operates to activate the processor for executing the code sequence. A key value is compared to each lock value for selectively activating the processor to execute the code sequence when the key value equals the lock value. The processor executes the activity specified in the code sequence if the detected event satisfies the conditional statement and continues execution of the software program whereby continuous-processing in the SPC exchange is maintained.

BRIEF DESCRIPTION OF THE DRAWINGS

For a more detailed understanding of the present invention and for further objects and advantages thereof, reference can now be made to the following description taken in conjunction with the accompanying drawings, in which:

FIG. 11 is a schematic representation of the access process of FIG. 9 connected to a simple device processor in accordance with the invention;

FIG. 12 is a flow chart showing a process for creating a pre-runtime daemon in accordance with the invention;

FIG. 13 is a flow chart showing a process for creating a runtime daemon in accordance with the invention;

DETAILED DESCRIPTION

Figure 2:
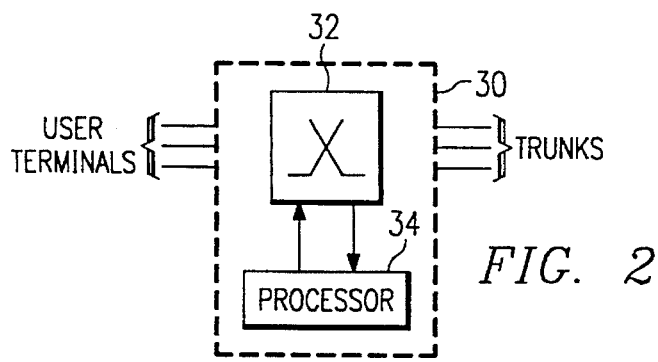
FIG. 2 is a schematic illustration of an SPC exchange comprising a switch and processors as used in the telecommunications network of FIG. 1.
Figure 2A:
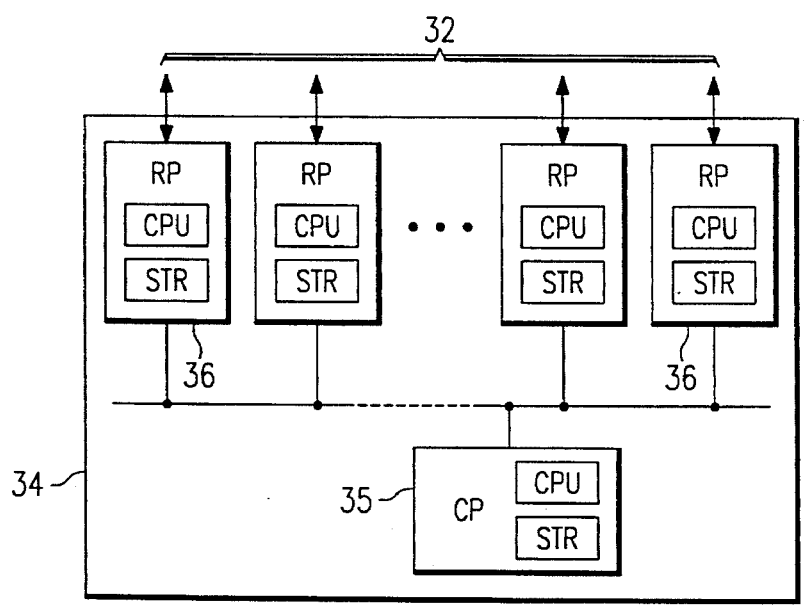
FIG. 2A is a schematic representation of a first embodiment of the SPC exchange shown in FIG. 2.
Figure 2B:
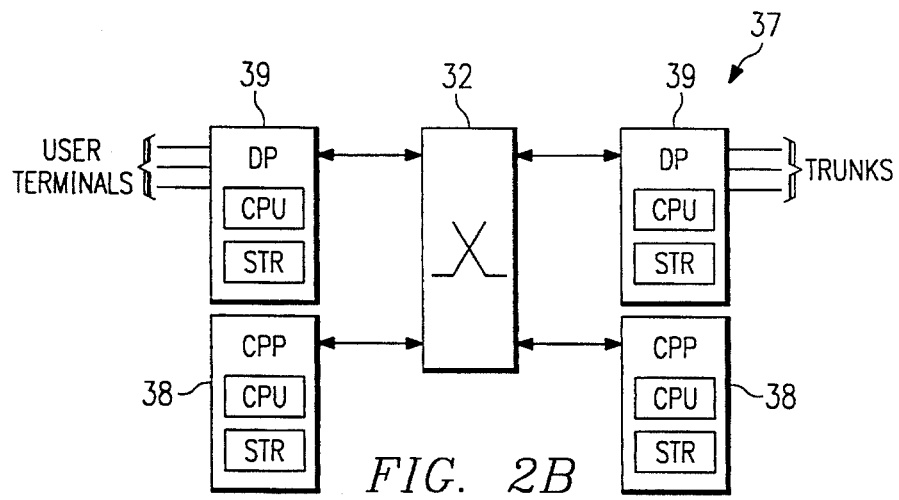
FIG. 2B is a schematic representation of a second embodiment of the SPC exchange shown in FIG. 2.

Referring generally to FIGS. 2 and 2A, the SPC exchange 30 can be, for example, the type manufactured by Telefonaktiebolaget L M Ericsson (hereinafter "Ericsson") and referred to as the AXE exchange. The processor 34 of an AXE is shown in more detail in FIG. 2A as comprising one central processor (CP) 35 connected to a plurality of regional processors (RP) 36 communicating with the switching equipment 32. Each regional processor (RP) 36 and the central processor (CP) 35 includes a central processing unit (CPU) and memory (STR). The regional processors (RP) 36 assist the central processor (CP) 35 in performing routine tasks occurring in the SPC exchange 30. All decisions, however, are made by the central processor (CP) 35. This hierarchic structure is described in more detail in a book titled "Getting to Know AXE," EN/LZT 101 548 R2A, published by Ericsson, and incorporated herein by reference. However, the SPC exchange 30 also can be one having a plurality of processors 34 in a distributed, rather than a hierarchic, structure such as the one shown generally at 37 in FIG. 2B comprising common-pool processors (CPP) 38 and dedicated device processor (DP) 39 all communicating directly with the switching equipment 32.

Figure 3A:
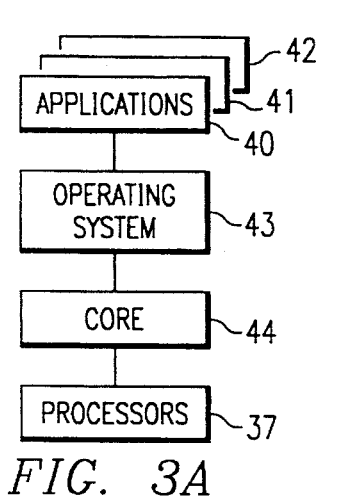
FIG. 3A is a block diagram showing the software executed on the processors of the SPC exchange shown in FIG. 2B.

Each common-pooled processor (CPP) 38 and device processor (DP) 39 has its own CPU and STR, and all of them communicate with each other through the switch 32. All of the common-pool ed processors (CPP) 38 are of equal importance in the telecommunication network. In such a distributed system, software applications 40–42 (FIG. 3A) are built on a common operating system 43 loaded on top of the processors 37, all of which appear to the operating system 43 as having the same memory core 44. Different applications will require different processors, but they will all run on the same operating system 43. Execution of all applications 40–42 are carried out within a number of different processes (not shown) stored for running on the processors 37. Thus, a process is an environment for executing an application program. For example, the execution of the application 40 might require several processes which cooperate as their functionality is distributed over several processors. Typically, thousands of processes will be running simultaneously on each processor 38, 39.

Figure 3B:
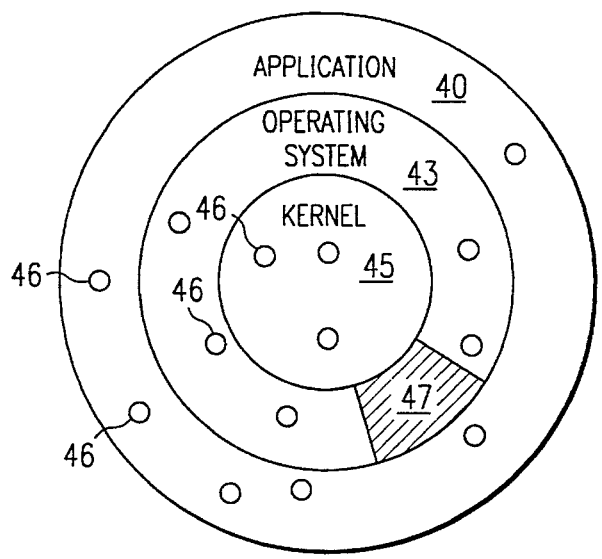
FIG. 3B is a pictorial representation of the software for execution on the processors shown in FIG. 3A including a trace-tool in accordance with the invention.

Referring more specifically to FIG. 3B, the application 40 running on the operating system 43 communicates with the runtime part of the core 44, i.e., the kernel 45, when executing in a process. Thus, the kernel 45 controls the execution of the processes during runtime. All events of interest during the execution of an application are monitored by a trace tool 47 which is a subprogram in the operating system 43 and the kernel 45. The detection of events is made possible by the insertion of code sequences, i.e., daemons 46, at any level in the software as shown by the small circles distributed through the application 40, operating system 43, and the kernel 45. The daemons 46 are located at certain addresses in the code where analysis is required, and always include a predefined set of filter conditions and corresponding actions. An example of such a daemon is as follows:

--- if (ON)
    if    (condition 1 = true)
        action 1;
    if    (condition 2 = true)
        action 2;
© 1993 Telefonaktiebolaget LM Ericsson

--- where, for example, condition 1 is a first variable or state and condition 2 is a second variable or state, and action 1 could be the logging of an event and action 2 could be the start of another tracing. The variables that could be used for these qualifications could be variables read from the system or variables belonging to the trace tool 47 itself. In the latter case, those variables could be used for counting the number of times a particular event occurs, and then performing the corresponding action only when the count exceeds some predetermined number. When the application programs 40–42 start executing, they output the identity of all stored daemons 46 to the trace tool 47. The trace tool 47 identifies all of the daemons 46 in the network, including those in the code resident on the other processors forming the telecommunication network, and outputs a list and description of the daemons 46 to the designer and certifier.

Figure 4:
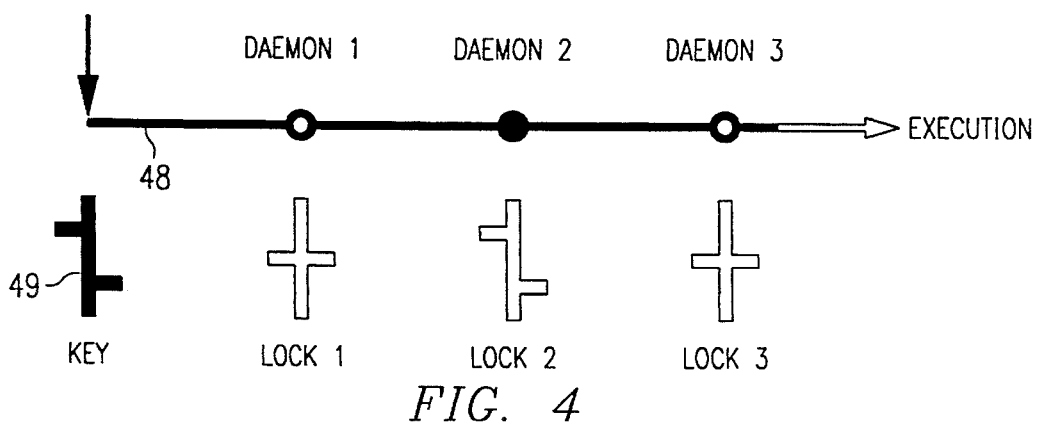
FIG. 4 is a pictorial representation of a lock and key technique used by the trace-tool of FIG. 3B for thread-tracing in accordance with the invention.

A daemon 46 will be either in an active state or inactive state as defined by the stored data. If a daemon 46 is in an active state, it will be checked during execution. If the daemon 46 is not active, the kernel 45 bypasses the daemon 46 and continues execution. The tracing system is sensitized or desensitize by using the activation state in conjunction with a "lock and key" technique in accordance with the invention. Referring more specifically to FIG. 4, a thread-trace shown at 48 commences at the vertical arrow and continues execution as shown by the horizontal arrow. This portion of the thread-trace 48 comprises several daemons, daemons 1, 2 and 3, implanted in the code and represented again by small circles; and a "lock" associated with each daemon, locks 1, 2 and 3 respectively, stored as data. Each daemon 46 has a name, a short description, and the address of its "lock-table" stored in the trace tool 47, hereinafter collectively referred to as the "daemon summary information."

When thread-tracing commences, a key 49 is attached to all software signals or messages sent during execution. If the key 49 does not fit the lock, the daemon is not activated and execution of the code continues. If, however, the key 49 does fit the lock, the daemon will be opened, or activated. Referring in more detail to FIG. 4, the key 49 does not fit lock 1 so that execution of the code continues without activating daemon 1 as indicated by the open circle. However, the key 49 does fit lock 2 which activates daemon 2 as indicated by the solid circle. After the predetermined filter conditions of daemon 2 are checked and the corresponding action is performed, execution of the code continues. Since the key 49 also does not fit lock 3, execution continues without activating daemon 3 as indicated by the open circle. The information collected during the thread-tracing operation is first filtered and then stored in a trace buffer before being presented to the designer.

The most important difference between the trace tool 47 and a debugger is that, in the case of the former, execution of the code always continues after performing some action or actions; execution is not completely halted for intervention by a designer as in a debugger. Thus, a debugger halts execution in the software while the trace tool 47 continues execution after completing action(s) because of the requirements of a continuous processing system. Thus, a daemon 46 controls access to the code without completely halting execution of the code.

When a daemon 46 is implanted at a specific address in the code, one can monitor that point or object independently of which process or thread is active, i.e., point tracing. Referring to FIG. 4, for example, every execution passing daemon 2 would be traced when the activity is set for point tracing. When, however, the designer of the operating system 43 activates or deactivates the key structure to open all of the daemons 46 in a specific process, this is process tracing. When process tracing, a designer has the ability to debug the process. But if in addition to process tracing the key structure is assigned to all software signals or messages sent from a process, this is thread tracing. When another process receives such a message, the key structure is assigned to the receiving structure and activated when the receiving process is activated. This receiving process could be allocated to a different processor 37 in the telecommunication network. Thus, if one wishes to analyze the application 40 as it executes in many processes distributed over several processors 37, a point trace defines the beginning of a trace thread that propagates from one process to another.

Figure 1:
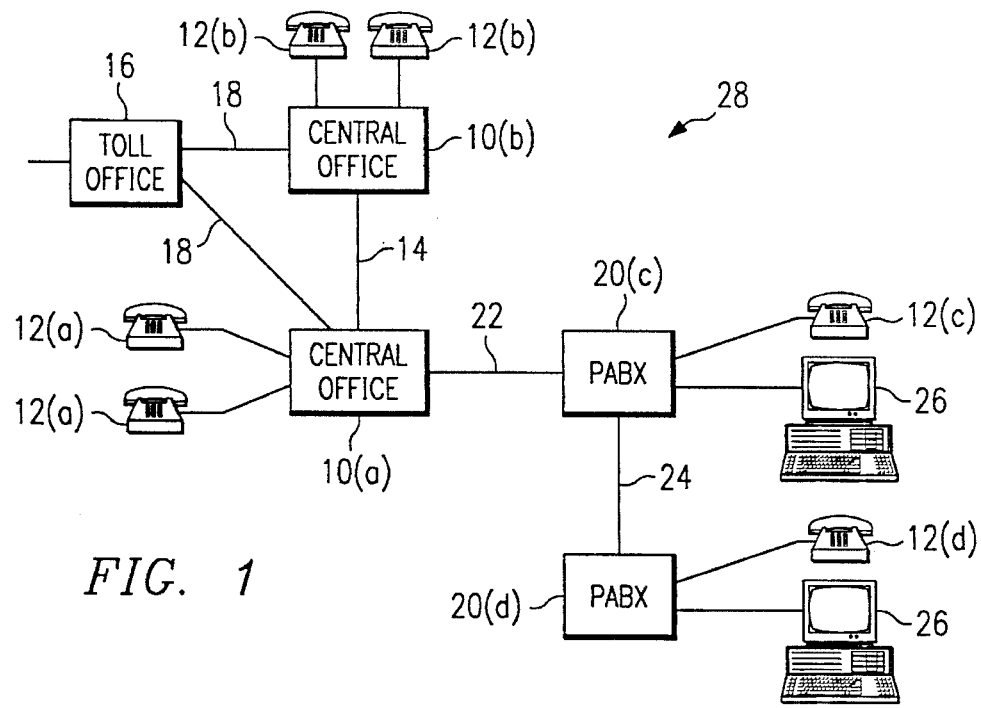
FIG. 1 is a schematic illustration of a telecommunications network including private and local exchanges on which the present invention can be practiced.

Thread tracing can best be described by another example related to a telephone call which is a combination of many processes. Referring generally to FIG. 1 and more specifically to FIG. 5, User A commences execution of a trace-thread 50 when the terminal 12(c) goes off-hook in an attempt to establish a speech path to User B at the terminal 12(d) from the originating PBX 20(c) over the trunk 24 to the terminating PBX 20(d). Assuming that both PBXs 20(c) and 20(d) are the type of SPC exchanges shown in FIG. 2B, both include a common-pooled processors (CPP), CPP1 to CPP4, connected to the corresponding terminal 12(c) and 12(d). Each PBX 20(c) and 20(d) includes other processors (not shown), such as, for example, separate device processors (DP) 39 connecting the trunk 24. The application programs associated with call initiation are executed within a large number of different processes, as described above, some of which are shown in FIG. 5 as squares with cut-off corners 51–55, which run on the processors indicated. The trace-thread 50 propagates between the processes 51–55 by means of software signals or messages 56–59.

Users A and B are both serviced by access processes A and B 51, 55 running on CPP1 and CPP4, respectively. When a call is made, the access process 51 for the originating side A orders up a traffic control process 52 which controls traffic handling for the originating side A on CPP2. When the terminating side of the call has been determined after a number analysis, the traffic control process 52 requests the set up of a similar process for control of the terminating side B, i.e., traffic control process 54, which runs on CPP3. The traffic control process 54 on the terminating side B checks for the availability of User B by means of the access process 55 running on CPP4. The processes 51–55 which form the trace-thread 50 are linked by the messages 56–59. The portion of the trace-thread 50 within the access process 51 on the originating side A includes three daemons, shown as small circles on the trace-thread 50, which are implanted at specific addresses in the code of the access process 51. The operation of the thread tracing therein is identical to that described with respect to daemons 1, 2 and 3 in FIG. 4 above, except for the limitation that all the daemons in this case have been predefined for a single process, access process 51, rather than being distributed over several processes. The same description applies to the daemons shown in the other processes 52, 54, 55 which have been activated according to different data. For example, none of the daemons implanted in the half call process 52 on the originating side A have been activated as indicated by the open circles, so that execution of code continues therethrough. However, the first and second daemon in the half call process 54 on the terminating side B have been activated, as indicated by the solid circles, by a key carried on the message sent to the traffic control process 54.

Figure 6:
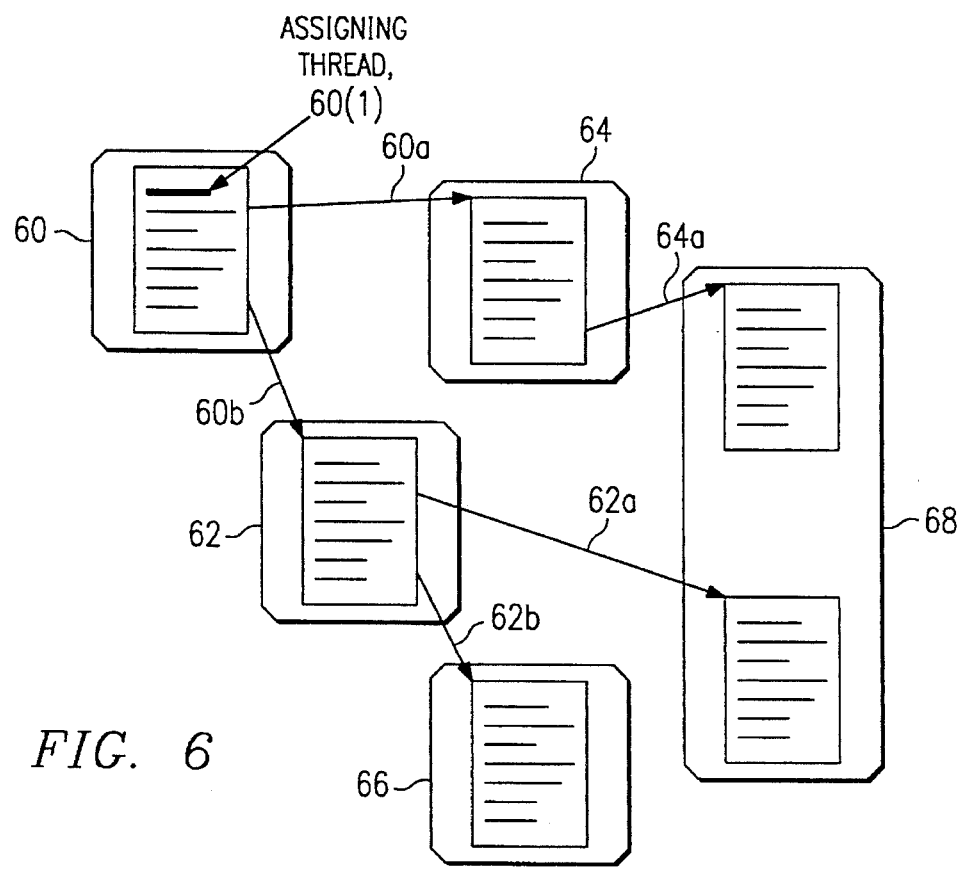
FIG. 6 is a schematic representation of trace-threads propagating through processes being executed on an exchange similar to that disclosed in FIG. 2B.

Referring now to FIG. 6, a number of processes 60, 62, 64, 66, 68 are shown which are used to illustrate the method of thread tracing in more detail. The rectangles enclosed within of the processes 60-68 each represent a block of code containing several lines of code, represented by the horizontal lines, to be executed by a processor. The same block of code can be used by different processes. For example the blocks of code in processes 62 and 64 could be the same.

The beginning of a trace-thread must be defined by a daemon used for point tracing, where one of the resulting actions is to start thread tracing as described above. The daemon that starts a trace-thread can detect any event in the system, whether an external event like the "off-hook" event as described above or an internal event. An internal event could also define the start of another trace-thread. In fact, every instruction step or line of code could be the start of a trace-thread. It is noted that all daemons can be used for point tracing although some are inserted mainly to be used as start points for thread tracing.

Generally, a trace-thread is a tree of execution branches as shown in FIG. 6. For example, a first daemon implanted at line 60(1) of the code in process 60, as indicated by the darker line, starts the thread tracing and assigns an identity to the trace thread. The trace-thread propagates through the other processes forming branches 60a, 60b, 62a, 62b and 64a. Two branches can pass through the same process independent of each other as does branch 62a and 64a, both of which propagate through and terminate at the process 68. Referring to the same processes in FIG. 7 for another example, a second daemon implanted at line 60(5) of the code in process 60 and a third daemon implanted at line 64(2) of the code in process 64 both start thread tracing and assign an identity to the corresponding trace-thread. In this example, there are two separate trace-threads, one comprising branches 60b, 62a and 62b, and a second comprising only branch 64a. Since the first daemon did not implant a trace-thread at line 60(1) of the code in process 60 because it is inactive, the trace system would not include branch 60a as a trace-thread because there is no trace-thread identity. However, both trace-threads still propagate through and terminate at process 68.

Figure 8:
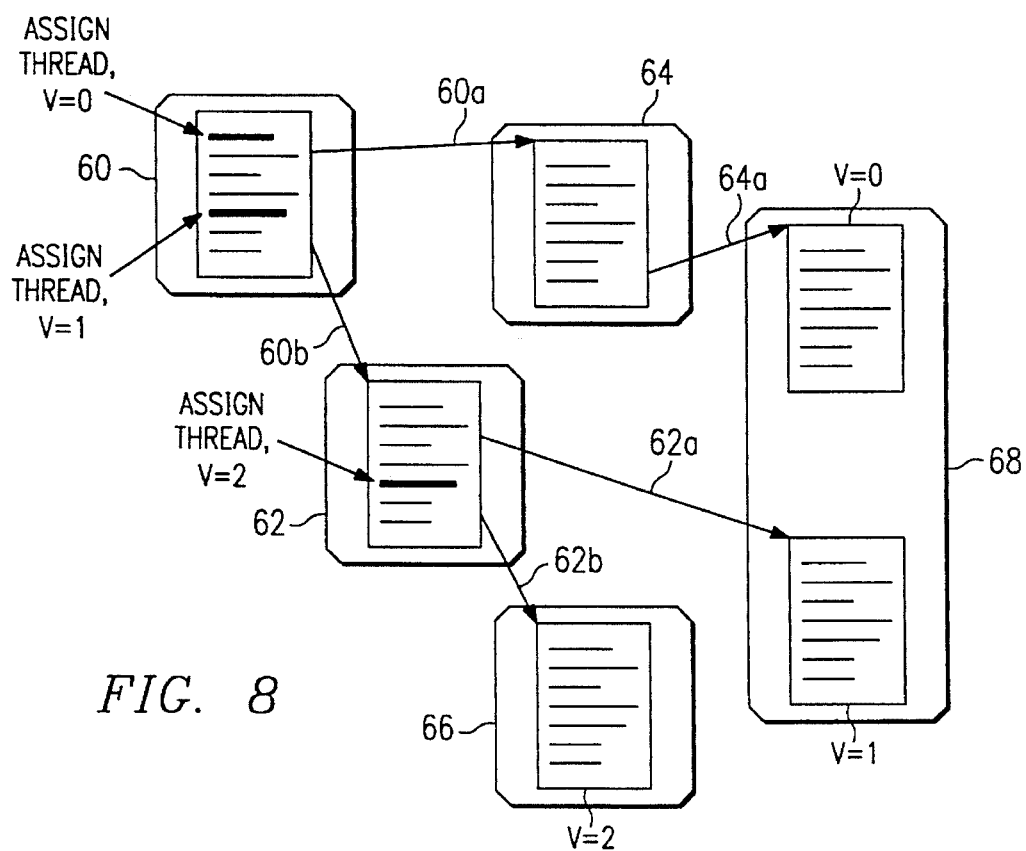
FIG. 8 is a schematic representation of yet another set of trace-threads propagating through processes being executed on an exchange similar to that disclosed in FIG. 2B.

Referring now to FIG. 8, it is possible to allocate variables (v) to a trace-thread, i.e., thread-bound variables. These thread-bound variables can be used for counting the number of times certain events occur or for changing the behavior of daemons in the trace-thread according to previous events. Such daemons can update any variable as an action based on some qualification as described above. If a thread-bound variable is updated in a trace-thread, it is only valid in that particular branch of the trace-thread. Thus, although branch 62b has been updated twice (v=2), branch 62a has been updated only once (v=1). During the same time, branches 60a and 64a have not been affected (v=0) by the updating of the other two branches.

Figure 5:
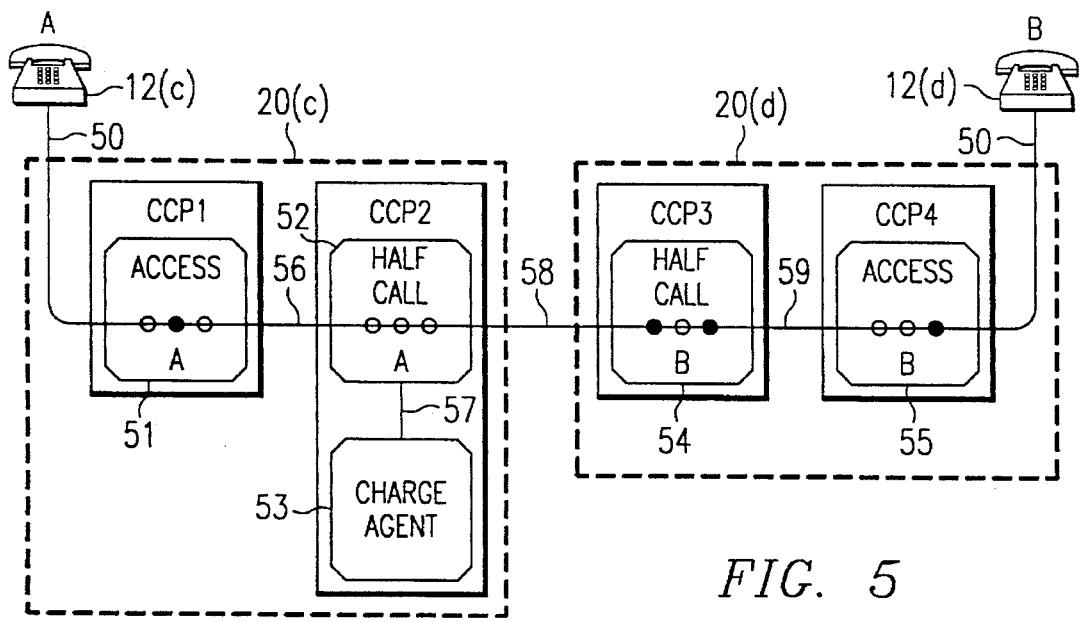
FIG. 5 is a schematic representation of the PABX exchange network of FIG. 1 showing processes used for a phone call in accordance with the invention.
Figure 9:
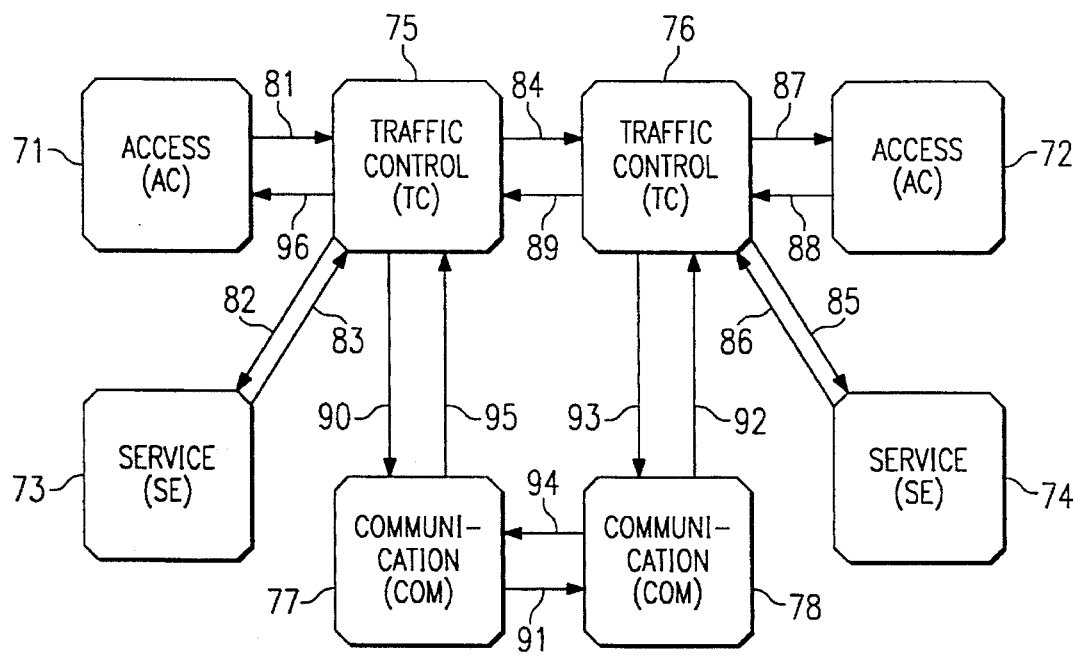
FIG. 9 is a schematic representation of any portion of the network of FIG. 1 showing processes used for a phone call in accordance with the invention.
Figure 10:
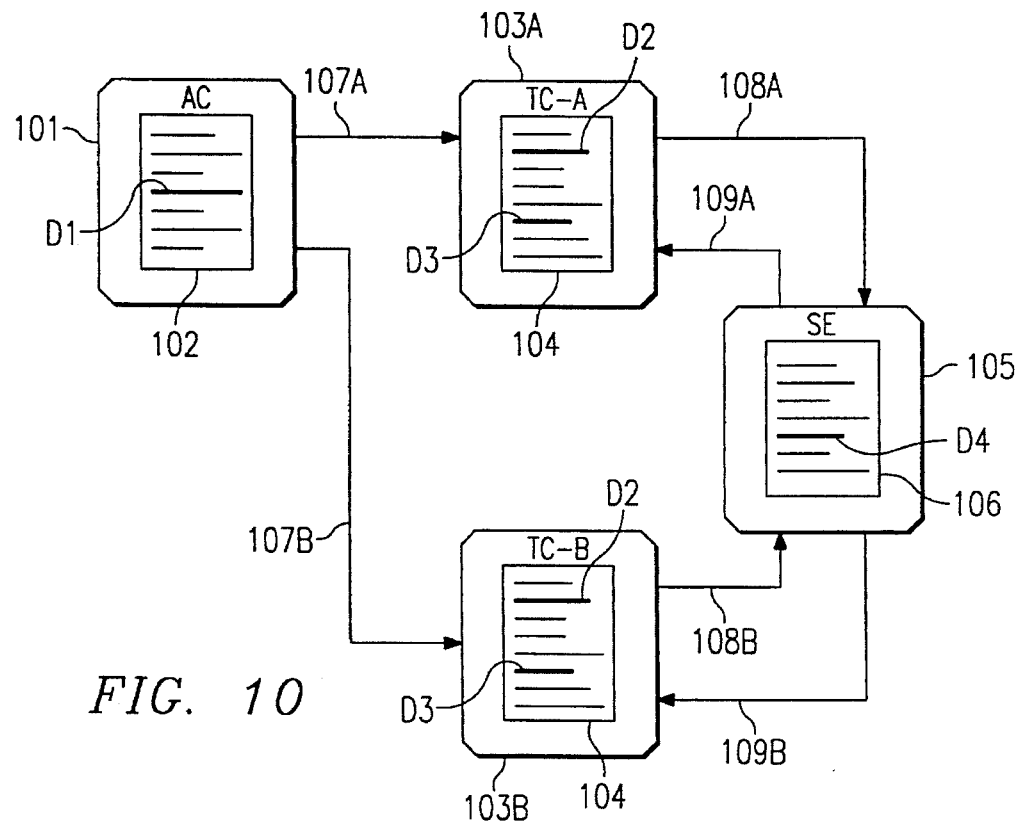
FIG. 10 is a schematic representation of the access, service and traffic control processes of FIG. 9 for handling two phone calls in accordance with the invention.

As indicated above, the application programs associated with a call are executed within a large number of processes which can run on different processors. Thus, a call can be describe independently of processors in a form similar to that shown in FIGS. 6–8. All of the processes required by a call can be more simply illustrated without referring to the processors as shown in FIG. 5. A complete call in terms of processes is shown in FIGS. 9–11. Referring more specifically to FIG. 9, a schematic diagram of the more significant processes required for a call is shown. These processes comprise access processes (AC) 71 and 72, service processes (SE) 73 and 74, traffic control processes (TC) 75 and 76, and communication processes (COM) 77 and 78. A process can be static or dynamic depending on whether the process is needed all the time, i.e., a static process, or only during the execution of a particular activity, i.e., a dynamic process. Static processes are defined by the configuration of the network when software is loaded and a processor commences execution, and include without limitation the access and service processes. Another example of a static process is the set-up and supervision of a call. The traffic control and communication processes are examples of dynamic processes.

In operation, there is no difference between the static process and the dynamic process. Both subscribers are serviced by the access processes (AP) 71 and 72. When the originating subscriber lifts the handset to make a call, the following sequence of messages, represented by arrows 81–96, is initiated. The access process (AP) 71 orders up a half call by sending message 81 to create the traffic control process (TC) 75 (only one step in the half call process) which in turn sends a message 82 to the service process (SE) 73 for obtaining information about the receiving subscriber, e.g., number analysis, location determination, routing analysis, charging and other services. The service process (SE) 73 responds by sending message 83 to the originating traffic control process (TC) 75 which selects a free outgoing line in the route and reserves it for transmission of message 84 to create the terminating traffic control process (TC) 76. The terminating traffic control process (TC) 76 receives the destination data and uses the service process (SE) 74 via messages 85 and 86 to analyze the information and checks whether the called subscriber exists. If the called subscriber exists, the terminating traffic control process (TC) 76 then sends message 87 to the terminating access process (AC) 72 to determine if the other party is available. If that party is available, the access process (AC) 72 informs the traffic control process (TC) 76 via message 88 which communicates that information to the originating traffic control process (TC) 75 via message 89. The originating traffic control process (TC) 75 then orders the communication process (COM) 77 via message 90 to set up a voice path 91 which it originally reserved. When the voice path 91 is connected, the terminating communication process (COM) 78 acknowledges by sending message 92 to the terminating traffic control process (TC) 76 which returns message 93 to set up the return voice path 94. When the voice path 94 connects to the originating communication process (COM) 77, message 95 informs the originating traffic control process (TC) 75 that the connection is complete. Finally, the originating traffic control process (TC) 75 sends message 96 back to the originating access process (AC) 71 indicating that a through-connection has been completed.

Focusing on the processes as illustrated above facilitates analyzing the use of daemons for tracing according to the invention. Referring more specifically to FIG. 10, a schematic representation of the access (AC), service (SE) and traffic control (TC) processes of FIG. 9 for handling two phone calls, A and B, in accordance with the invention is shown. Both calls are serviced by the same access process (AC) 101 which uses code 102 having an implanted daemon, D1. The access process (AC) 101 sets up half calls by sending messages 107A and 107B, respectively, to create separate traffic control processes (TC-A, TC-B) 103A and 103B. Although the traffic control processes 103A, 103B are separate, they both use the same code 104 containing two daemons, D2 and D3. Both traffic control processes, TC-A and TC-B, communicate with the same service process (SE) 105 which uses code 106 containing a fourth daemon, D4. This example will be used to describe several different tracings (T1, T2 and T3), thread and point tracing, and how the tracings are grouped into separate trace collections (I, II and III).

The first tracing T1 is a point tracing wherein the first daemon D1 initiates a second tracing T2 if certain conditions are satisfied such as, for example, that subscriber 1111 is placing a call. The point tracing T1 would be used for both calls A and B and, if the first daemon D1 is activated, initiates two thread tracings T2 propagating through the other processes as represented by trace-threads 107A/108A/109A and 107B/108B/109B, collectively referred to hereinafter as trace threads 107–109. It should be noted that both of the trace threads 107–109 propagate through the same service process (SE) 105 as described generally above. The thread tracing T2 comprises three daemons D2, D3 and D4, each one of which if activated stores separate data X, Y and Z, respectively, as part of the thread tracing activity. The data can be, for example, relevant process-related data stored at the time the daemon is activated and/or relevant system-level data such as, for example, the identification number of the process itself. The first trace collection, trace collection I, comprises tracings T1 and T2 because both start at the same time.

However, a trace collection may consist only of one tracing. For example, the third tracing T3 can be an independent point tracing initiated by the second daemon D2 qualified by a predefined set of filter conditions with corresponding actions. The qualification might be, for example, that "if the calling subscriber is any one of 1111, 2222 or 3333, then store data XYZ." The second trace collection II would consist only of the third point tracing T3. This example illustrates that one daemon can be used for several independent tracings in a trace collection. Thus, the second daemon D2 is used in both the second and third tracings, T2 and T3, as part of trace collections I and II. All of the tracings, T1–T3, can be grouped together in a third trace collection III to collect all the information in one session. A significant advantage of such thread tracing as demonstrated by this example is that daemons can be qualified to store data at the source of a chain of events for review after the events have occurred.

Daemons can also be implanted in code used by a device processor (DP) such as, for example, device processor (DP) 110 showing two examples of a process 111, each one using the same code 112 having a daemon D5 implanted therein. The device processor (DP) 110 can be, for example, one dedicated to specific terminal equipment. The device processor (DP) 110 communicates with an access process (AC) 113 being executed by a common pooled processor (CPP) 114 via messages 116A, 117A and 116B, 117B. The access process (AC) 113 in turn communicates via messages 115A, 118A and 115B, 118B with other processes in a manner similar, for example, to the access process (AC) 101 shown in FIG. 10. Although the daemon D5 shares trace information with both calls A and B, it is only activated if the key fits the lock. The first thread tracing activity for call A is represented by trace-thread 115A/116A/117A/118A. If the key value contained in the message 115A fits the lock stored in the daemon D5, thread tracing will occur as represented by the solid arrows for the trace thread 115A/116A/117A/118A and relevant data will be stored. If, however, the key value obtained in the message for the second call B does not fit the lock of the daemon D5, there will be no thread tracing activity as represented by the dashed arrows for the trace thread 115B/116B/117B/118B.

Daemons 46 can be implanted in the code at different times. They can be generated during the design phase prior to runtime, i.e., pre-runtime daemons 46, or in connection with the trace session itself, i.e., runtime daemons 46. Typical pre-runtime daemons 46 are message daemons, daemons for time slice and for process creations and deletions, or daemons catching important general events in the application programs, such as the "off-hook" event. A flow chart showing the creation of pre-runtime daemons is shown in FIG. 12 starting at 121. The designer first defines the daemons 122 and then inserts or implants them in the application code 123. When the application is compiled 124, it is linked to the daemons 125 and then loaded into the main memory or storage used by the common pooled processor (CPP).

Figure 14:
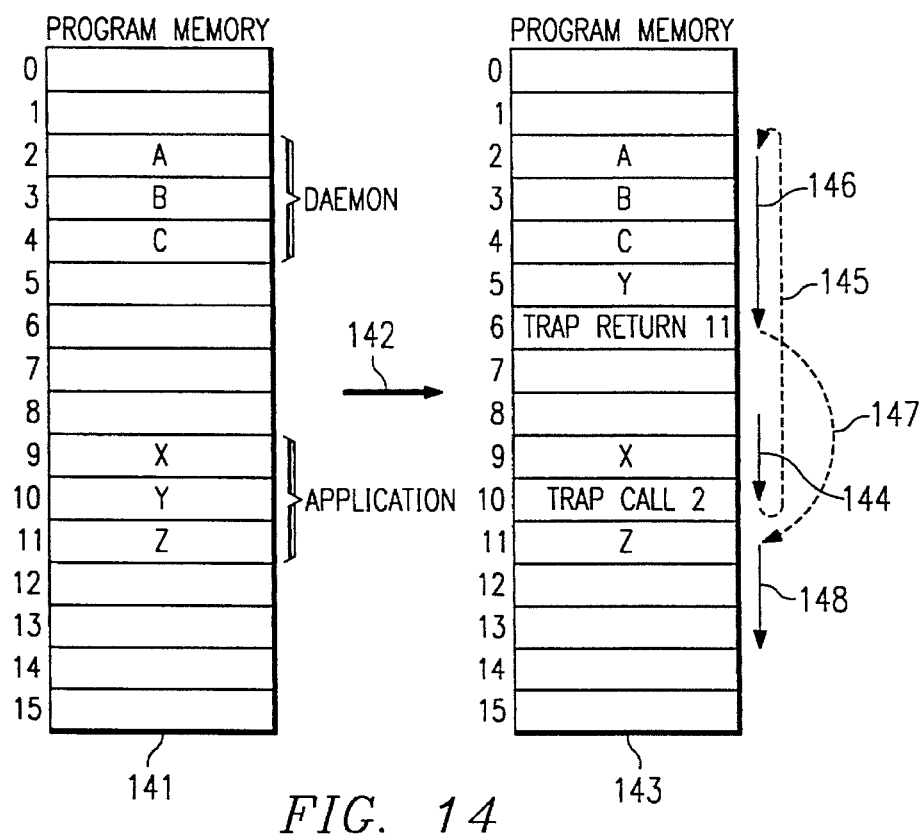
FIG. 14 is a pictorial representation of the program memory in a processor showing the execution of the runtime daemon created in FIG. 13.

Runtime daemons 46 can be assigned dynamically to certain code addresses, and have the same features as the predefined daemons. The runtime daemons are typically used for more detailed studies of critical areas. Their capabilities include reading and qualifying runtime defined variables and states, as well as logging those variables and states. The runtime defined daemons can also be designed to cover special circumstances for the application programs at the location where they are implanted. A flow chart showing the creation of a runtime daemon is shown in FIG. 13 at 131. The designer first defines the daemons 132, but then compiles the daemons 133 and loads them directly into the main memory or storage used by the common pooled processors (CPP) for subsequent use by an application. The trace tool's functionality in the operating system and the kernel inserts the trap in the application. See FIG. 14.

Both the runtime daemons and the applications are stored in program memory as shown at 141 which shows 15 lines of code wherein the daemon is implanted in lines 2–4 and the application is stored at lines 9–11. After the process of trap insertion is implemented according to the invention, the program memory 141 transitions as indicated by the arrow 142 to the form shown at 143 wherein the execution path is shown by arrows 145–148. Prior to execution of the application, the command "trap call 2" is inserted at line 10 replacing the Y code of the application which is inserted at line 5 after the runtime daemon followed by a "trap return 11" command. When the application is executed, it jumps from line 10 of the program memory 143 to line 2 as indicated by the arrow 145 to commence execution of the daemon. The processor then executes the daemon and the Y code removed from the application as indicated by the arrow 146. The processor then continues execution by returning from line 6 to line 11 as indicated by the arrow 147 to continue execution of the application as indicated by the arrow 148. Again, it is important to recognize that execution of the application program continues in accordance with the invention. In operation, runtime daemons 46 work exactly the same as pre-runtime daemons 46. Therefore, to simplify the following description, daemons 46 will be referred to in the context of a pre-runtime daemon 46 unless stated otherwise.

As indicated above, each daemon has a lock-table through which the daemon can be activated or deactivated. Accordingly, different methods are used to assign the lock structure to a daemon. If the network is small so that the risk for name conflict is minimized at compile time, each daemon can be assigned a unique lock structure at compile time. However, if the software is being designed at different sites, there is a greater risk for name conflicts requiring the use of a more sophisticated method. One possibility is to assign a unique lock at load time. In that case the loader has to take care of name conflicts and assign different lock structures for identical daemons in different load modules. If tracing takes place in a large network of processors, the loader must keep track of a common database of unique lock data structures. Another possibility is to assign a unique lock to the daemons when the tracing is prepared by the trace tool 47. This minimizes the number of simultaneously active locks, since only those locks that are used for a tracing need to be assigned to daemons.

When several daemons are needed for one tracing, they are connected in a group by assigning a lock data structure common to all daemons in the group. Thus, a single key connected to a message will open the lock for all of the daemons in that group. This feature of being able to connect daemons together in a common group is important because it makes it possible to trace high-level and low-level events in a single tracing to determine concurrently the history of the related events. Other techniques can be used in conjunction with the lock and key method to link daemons in a single group which will be described below in more detail.

Each daemon has a name identifier, that identifies the daemon, uniquely in the SPC exchange 30. If the daemon is a pre-runtime daemon, the name has to be unique in the telecommunication network. In order to optimize the reading and detection of daemon identity during the tracing, the daemon name is replaced by a running identity. This identity consists of a word, easily read by the daemon qualification logic. The running identity can be assigned to the daemon at compile time if the risk of name conflicts can be minimized during compiling. If, however, the software is designed at different sites, the risk for name conflicts cannot be managed. Thus, the running identity has to be assigned to the daemon at load time. Another possibility is to assign the running identity to the daemon when the tracing is prepared by the trace tool 47. The trace tool 47 assigns the running identity as a number for each daemon 46 in the tracing. These numeric identities are then used to select the desired qualifications and actions for each daemon 46 in the tracing. The rationale for selecting one of these methods is similar to those for assigning unique lock structures as described above. The only difference is that the running identity is not optimized to the same degree as the lock, so the number of available identities is larger.

Figure 7:
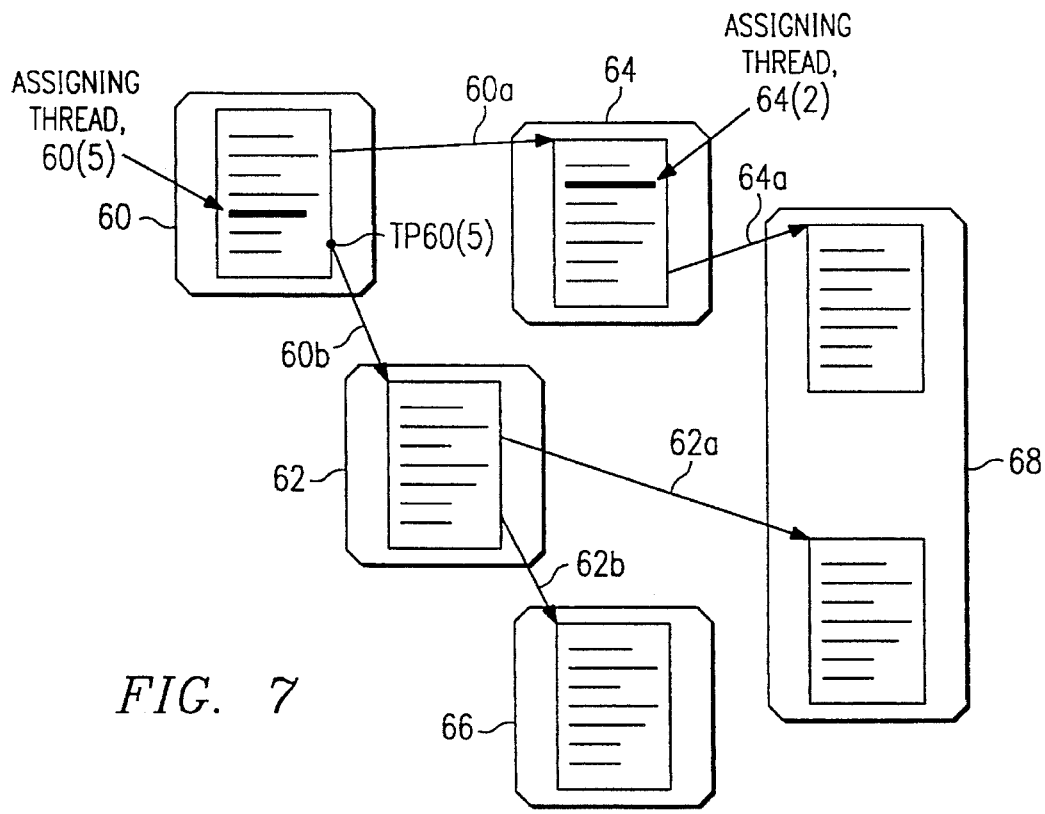
FIG. 7 is a schematic representation of another set of trace-threads propagating through processes being executed on an exchange similar to that disclosed in FIG. 2B.

The keys and locks method also can be used for debugging which makes it possible to debug a separate activity or process during runtime without disturbing other activities in the network. By connecting breakpoints for a debugger to a trace-thread, debugging several processes is possible. When a breakpoint is reached, the execution of that portion or branch of the trace-thread stops while the remaining portion continues propagating through the processes. Again, the feature of continued execution according to the invention is the difference between tracing and debugging as described generally above. If execution stops only where the breakpoint is reached, other branches of the trace-thread can continue to finish their activities. Referring to FIG. 7, for example, a breakpoint implanted at line at line 62(b) of the code in the processor 62 and activated would cease execution of the branch 62b of the trace-thread, but execution of the branch 62a would continue to completion. The branch 62b of the trace-thread cannot continue execution until a "continue" order is sent to the debugger.

All activity of a trace-thread can be stopped, if the scheduler receives information about the received breakpoint and corresponding trace-thread identity, and if that information is sent to all processors in which the trace-thread can possibly execute. Furthermore, the trace-thread has to be sent before any normal message in the system, that is, the debugging system must have exclusive access to the highest priority in the communication facility. If these conditions are satisfied, the scheduler can detect the trace-thread identity for each job that is to be scheduled, and suspend that process until the "continue" order is received.

Using these techniques, seldom-occurring failures can also be detected and analyzed. In such case, the trace-thread is automatically repeated and the resulting trace information is deleted during each cycle until the failure occurs. The trace information for the trace-thread in which the failure occurs is stored with others to build a history on that failure which can be analyzed at a later date. These techniques can also be used to determine the time at which two branches of a trace-thread arrive at a particular process or breakpoint. This can be important information because an improper order of arrival, which seldom occurs, would also generate a failure that is difficult to detect. Referring to FIG. 8, for example, a failure might occur during execution of the code in the process 68 if the branches 62a and 64a arrive out of order. In order to detect these timing, or race, conditions, a combination of the thread-bound variables (v) with process-imbedded variables within the code is used. The thread-bound variable shows which branch of the trace-thread is actually executing and the process-imbedded variable is used to remember which of those branches arrived first.

Figure 15:
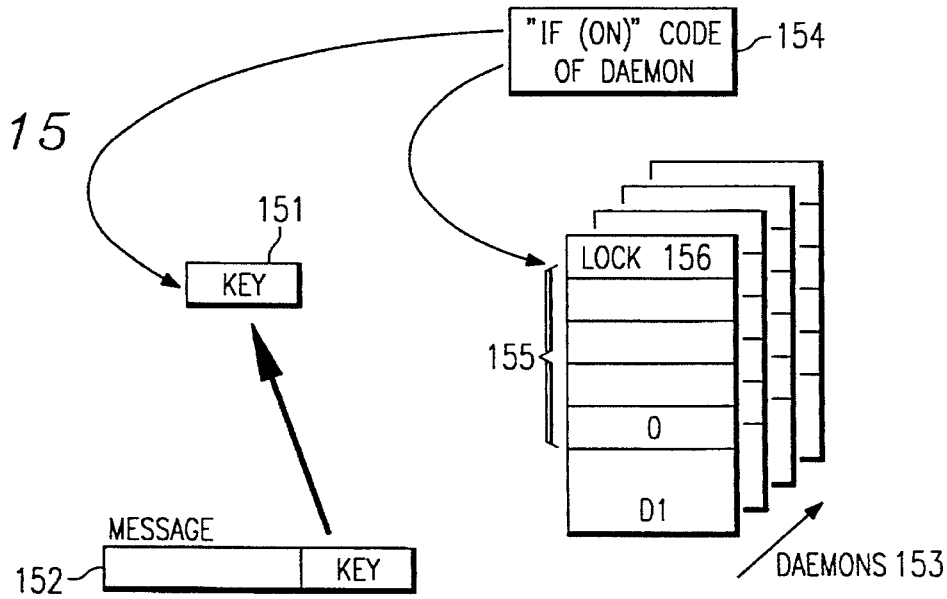
FIG. 15 is a pictorial representation of the word method for a single trace.

The keys and locks method is used to select or deselect daemons based on a conditional statement of the daemon, such as, for example, the "if (ON)" statement referred to above. The basic data structure for the keys and locks can be implemented by one of two different methods: the word method illustrated in FIGS. 15–18 or the bit method illustrated in FIGS. 19–22. Referring more specifically to FIG. 15, the word method uses a key 151 comprising a word ("word-key") that can be, for example, a word having a length of 16 bits connected to a message 152. The key 151 is compared with, or "fitted into," the lock associated with each of the daemons 153 trapped by an application program during execution. Whenever the word-key fits into the lock of one of the daemons 152, that daemon is activated as a result of the conditional statement 154 being satisfied. Each of the daemons 153 comprising this single trace-thread has its own table of locks 155 as shown for the first daemon D1. The table 155 contains a lock unique for each daemon and is updated for every trace session, depending on the particular requirements of the designer, when new daemons are created during pre-runtime or runtime. Typically, a group of daemons is created, as shown in FIG. 15, wherein all the daemons 153 have the same lock number, i.e., the group lock number 156, which permits the single key 151 connected to the message 152 to open all the daemons 153 in a single trace as described generally above. Alternatively, the lock table 155 can be empty and updated during runtime just prior to commencing a tracing session which requires certain daemons. Updating during runtime provides the advantage of conserving capacity when tracing, because the locks not selected will not be read.

The in-line portion of the daemon is programmed as follows:

```
if (key ! = 0) {
    for (i=0; locks [i] ! = 0; i++)
        if (key == locks [i])
            daemon_ON_call ( );
© 1993 Telefonaktiebolaget LM Ericsson
```

Figure 17:
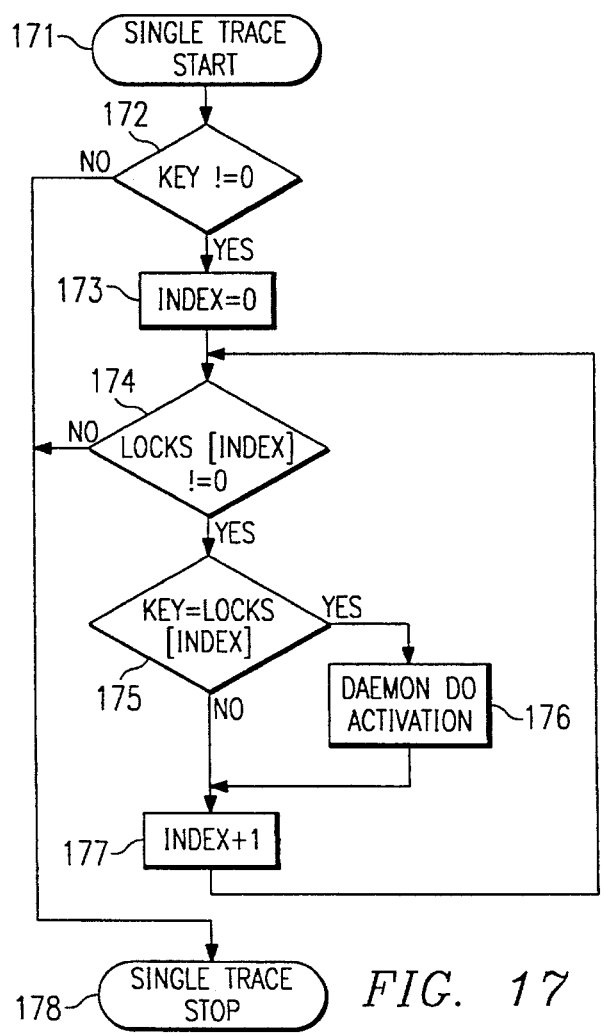
FIG. 17 is a flow chart showing the key-lock code for the word method shown in FIG. 15.

Referring more specifically to FIG. 17, a flow chart showing the key-lock code for a single trace using the word method is shown starting at 171. Step one is to determine whether the word-key 151 is currently being utilized. This is accomplished at 172 by comparing the value of the word-key to zero. If the value of the word-key 151 is equivalent to zero it is not in use and therefore the single trace is stopped at 178. However, if the word-key 151 is in use (i.e., its value does not equal zero) then each lock contained within the table of locks 155 is compared with the word-key 151 to determine if the word-key 151 will open the lock to activate the daemon. The second step at 173 is to initialize the value of a lock index variable ("LIV") to zero. A LIV is necessary to access each individual lock contained within a lock table associated with a designated daemon. The third step at 174 is to access the lock table 155 and determine if any of the locks contained therein can be opened by the word-key 151. Accessing is accomplished by utilizing the value of the LIV to correspond with a single lock stored in the lock table 155 ("accessed lock"). The fourth step is to determine if the accessed lock is being utilized. This is accomplished by comparing the value of the accessed lock with zero at 174. If the value of the accessed lock equals zero, it is not currently in use and, therefore, none of the other locks contained within the lock table are in use. Thus, the single trace stops at 178. If the value of the accessed lock does not equal zero, then the fifth step at 175 is to determine whether the word-key 151 will open the lock. This is accomplished by comparing the value of the word-key 151 to the value of the accessed lock. If the value of the word-key 151 equals the value of the accessed lock, then the activity associated with the designated daemon will be performed at 176 and the method will proceed to the sixth step. If the word-key 151 will not open the accessed lock, the method will also proceed to the sixth step. The sixth step at 177 is to increment the LIV so that it will be able to access a different lock within the table of locks 155. Steps three through six are repeated until the value of the accessed lock equals zero which results in the single tracing being stopped at 178.

Figure 16:
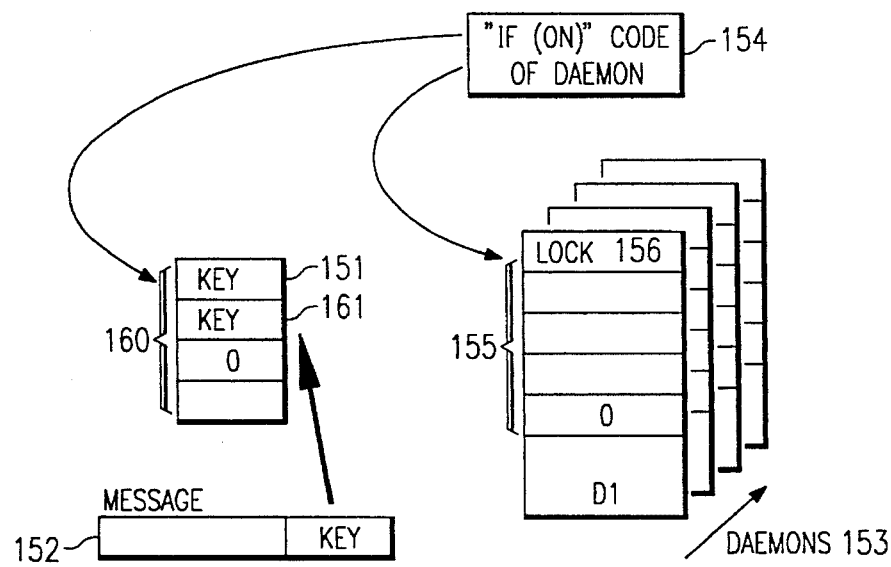
FIG. 16 is a pictorial representation of the word method for multiple traces
Figure 18:
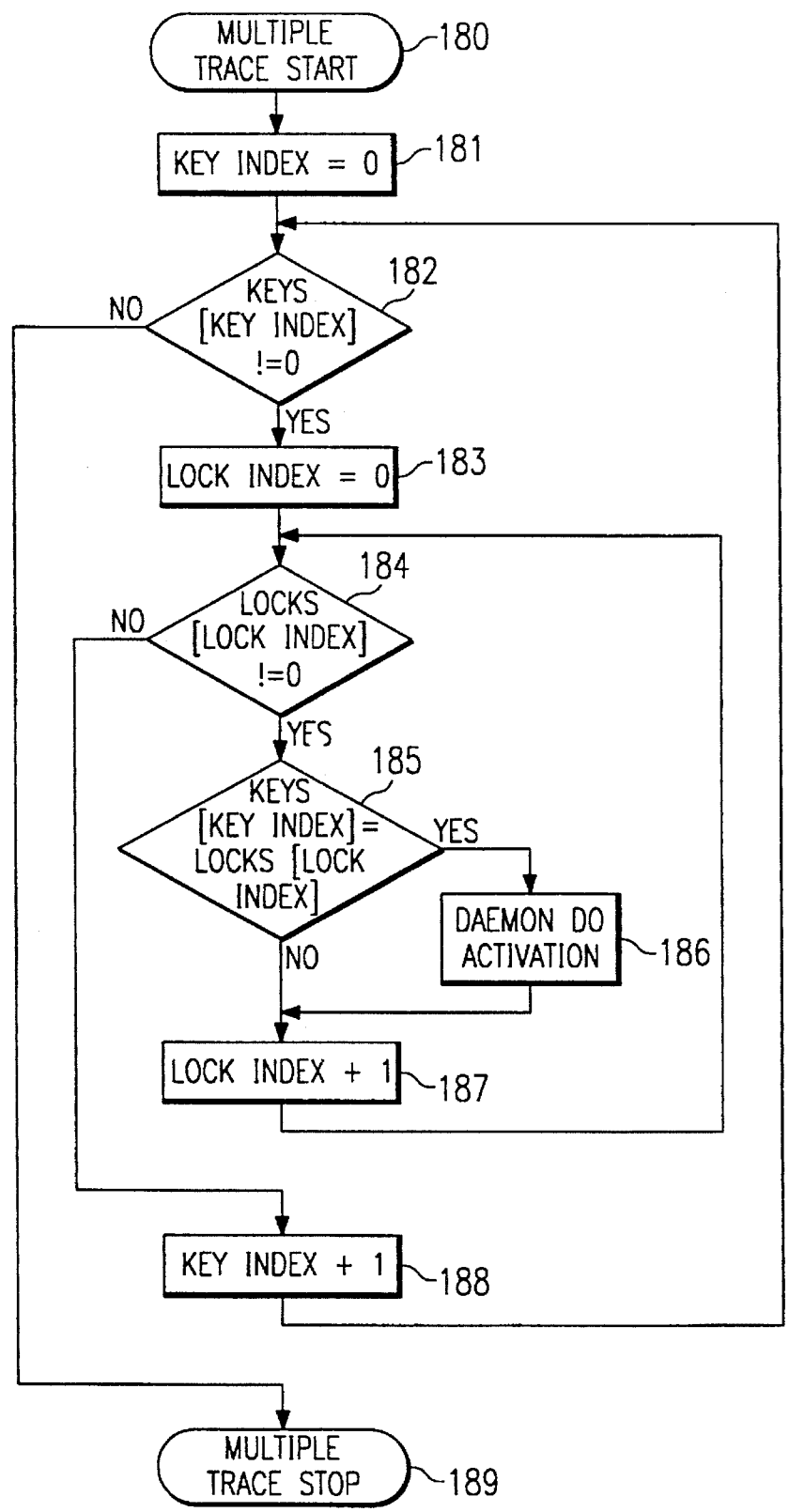
FIG. 18 is a flow chart showing the key-lock code for the word method shown in FIG. 16.

As described above, independent tracings may occur simultaneously or a trace-thread debugging may occur contemporaneously with another tracing session. Referring generally to FIGS. 16 and 18, a pictorial representation and the corresponding flow chart showing the key-lock code for multiple traces using the word method is shown. More specifically, a table of word-keys 160 is required to store keys for both tracings, the original word-key 151 for the first tracing and a new word-key 161 for the second tracing. Each word-key 151, 161 activates the daemons having the corresponding lock number in its lock table 155. For example, the word-key 151 may activate all the daemons 153 having the group lock number, while word key 161 matches a different lock number found in the lock table of only two of the daemons. The in-line portion of the daemon would be programmed as follows:

```
for (j=0; keys [j] ! = 0; j++)
    for (i=0; locks [i] ! = 0; i++)
        if (keys [j] == locks [i])
            daemon_ON_call ( );
© 1993 Telefonaktiebolaget LM Ericsson
```

Referring more specifically to FIG. 18, the flow chart showing the key-lock code for a multiple trace is shown starting at 180. Step one is to initialize the value of a key index variable ("KIV") to zero at 181. A KIV is necessary since the word-keys 151, 161 for both tracings are stored in a key table 160. Step two at 182 is to compare the word-key stored in the table that is accessed by the corresponding value of the KIV ("accessed word-key") to see if it is currently being utilized. If the value of the accessed word-key is equal to zero, then it is not being used and the multiple tracing stops at 189. However, if the word-key is in use (i.e., its value does not equal zero) then each lock contained within a table of locks 155 is compared with the accessed word-key to determine if the word-key 151 will open the lock to activate the daemon. The second step at 183 is to initialize the value of a lock index variable ("LIV") to zero. A LIV is necessary to access each individual lock contained within a lock table associated with a designated daemon. The third step at 184 is to access the lock table 155 and determine if any of the locks contained therein can be opened by the word-key 151. Accessing is accomplished by utilizing the value of the LIV to correspond with a single lock stored in the lock table 155 ("accessed lock"). The fourth step is to determine if the accessed lock is being utilized. This is accomplished by comparing the value of the accessed lock with zero at 184. If the value of the accessed lock value equals zero, it is not currently in use and, therefore, none of the other locks contained within the lock table are in use. Thus the multiple trace stops at 189. If the value of the accessed lock does not equal zero, then the fifth step at 185 is to determine whether the word-key 151 will open the lock. This is accomplished by comparing the value of the word-key 151 to the value of the accessed lock. If the value of the word-key 151 equals the value of the accessed lock, then the activity associated with the designated daemon will be performed at 186 and the method will proceed to the sixth step. If the word-key 151 will not open the accessed lock, the method will also proceed to the sixth step. The sixth step at 187 is to increment the LIV so that it will be able to access a different lock within the table of locks 155. Steps four through six are repeated until the value of the accessed lock equals zero which results in the key index variable being incremented at 188, and the method proceeding to step two at 182.

Figure 19:
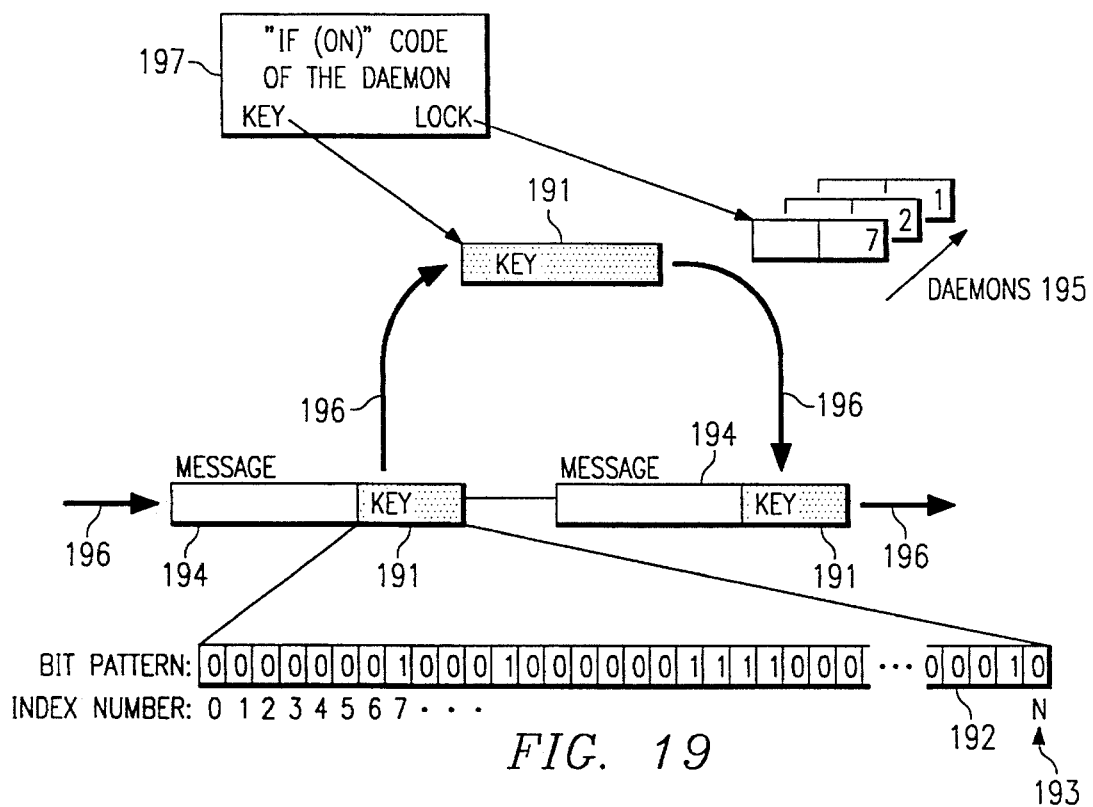
FIG. 19 is a pictorial representation of the bit method for a single trace.
Figure 21:
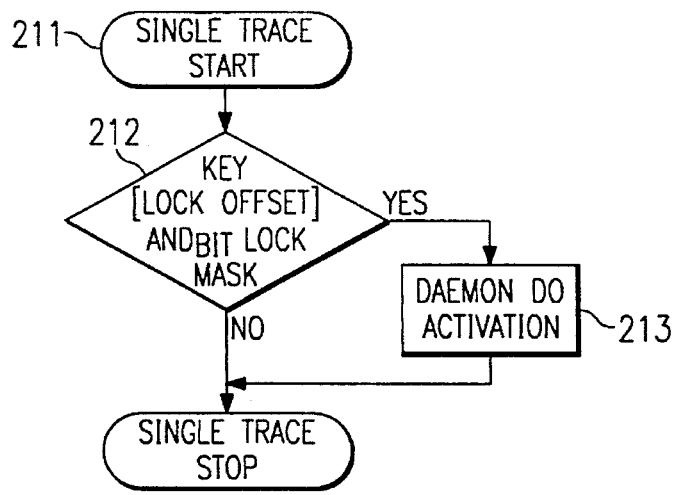
FIG. 21 is a flow chart showing the key-lock code for the bit vector method shown in FIG. 19.

FIGS. 19 and 21 are a pictorial representation and flow chart showing the key-lock code for a single trace using the bit method wherein the key 191 ("bit-key") is a bivector comprising a bit pattern 192 and a corresponding set of index numbers 193 for each daemon created. The bit-key 191 is connected to a message 194 and unlocks those daemons 195 have a logic 1 ("activation bit") in the bit pattern 192 corresponding to the index number matching the daemon number. For example, the set of index numbers 193 for the bit-key 191 are compared to the group of daemons 195 as indicated by the arrows 196. For every match, the conditional statement 197 activates or deactivates that daemon in response to the state of the corresponding bit in the bit pattern 192. Thus, the bit-key 191 activates daemon 7 associated with index number 7 as a result of the activation bit in the bit pattern 192, while the other daemons 195 are not activated as a result of the logic ("deactivation bit") in the corresponding bits of the bit pattern 195. The bivector nature of the bit-key 191 eliminates the need for the lock table 155 used in the word method. When the daemons 195 are grouped for thread-tracing, the bit-key simply contains an activation bit for each daemon on the group. The in-line portion of this daemon would be programmed as follows:

```
struct Lock
{
    int offset;
    int mask
} lock;
int key[MaxNoOfDaemons/BitsPerInt];
if (key[lock.offset] & lock.mask)
{
    daemonDoActivations();
}
                    © 1993 Telefonaktiebolaget LM Ericsson
```

Referring more specifically to FIG. 21, the flow chart showing the key-lock code for a single trace using the bit method is shown starting at 211. A designated daemon is comprised of a offset and mask variable. The offset variable is used to access the corresponding bit-key associated with the designated daemon. The mask variable is used to determine if the bit-key will activate the designated daemon. Step one is to compare the bit-key associated with the designated daemon at 212. This is accomplished by comparing an activation/deactivation (a/d) bit contained within the bit-key to a corresponding mask bit contained within the designated daemon's mask variable. If the a/d bit which corresponds to the mask bit is activated (equals one), a daemon is activated at 213 and single tracing stops at 214. If the a/d bit which corresponds to the mask bit is deactivated (equals zero), single tracing is stopped at 214.

Figure 20:
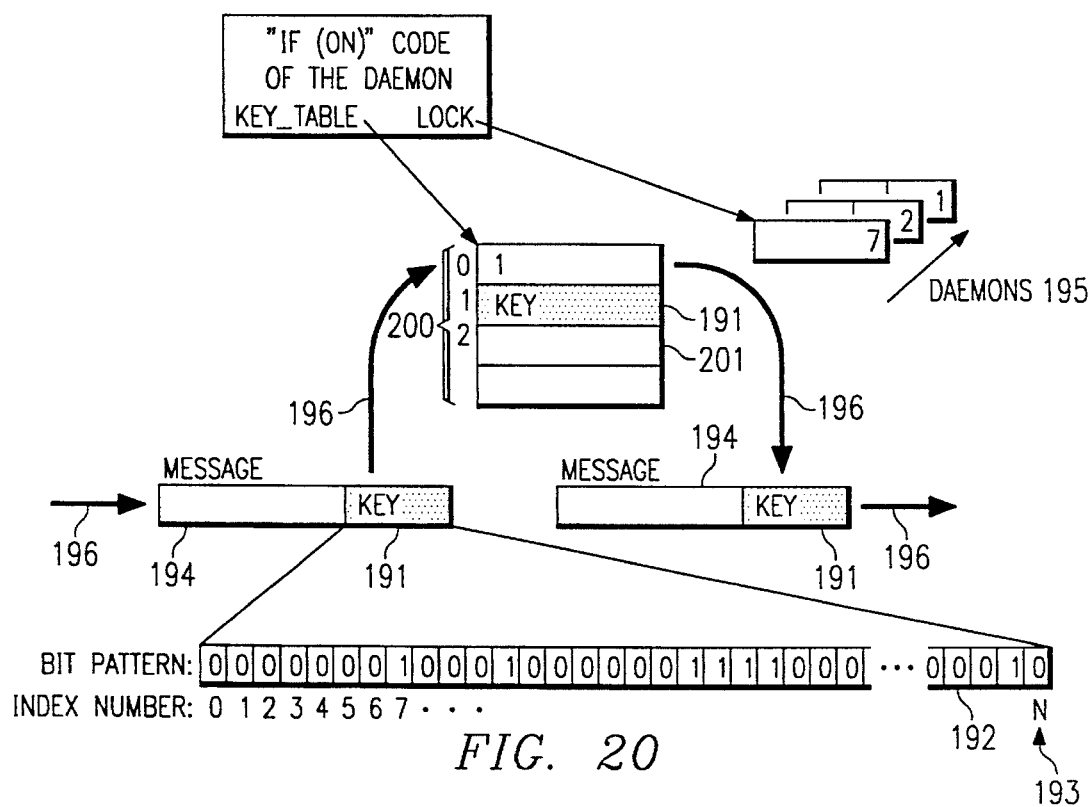
FIG. 20 is a pictorial representation of the bit method for multiple tracers.
Figure 22:
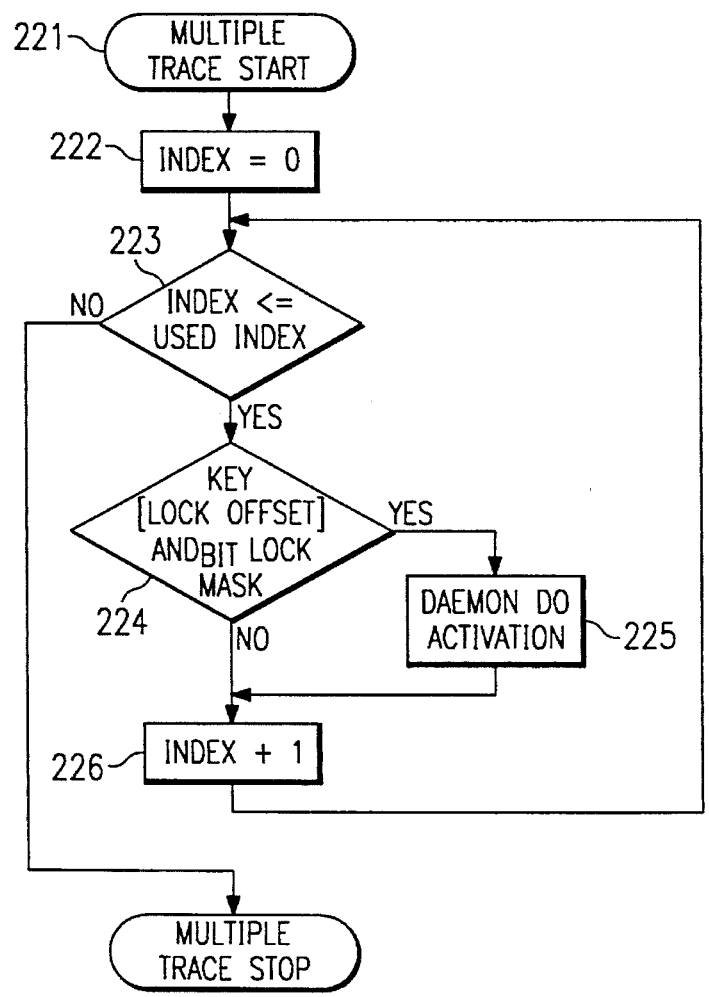
FIG. 22 is a flow chart showing the key-lock code for the bit vector method shown in FIG. 20.

As described above, independent tracings may occur simultaneously or a trace-thread debugging may occur contemporaneously with another tracing session. Referring generally to FIGS. 20 and 22, a pictorial representation and the corresponding flow chart showing the key-lock code for multiple traces using the key method is shown. More specifically, a table of bit-keys 200 is used to store keys for several tracings, the original bit-key 191 for the first tracing and a new bit-key 201 for the second tracing. Each bit-key 191, 201 activates the daemons having a corresponding activation bit in the bit-pattern 192. For example, the bit-key 201 may activate all of the daemons 195 if an activation bit is implanted at index numbers 1, 2 and 7 of the bit pattern 192.

In such case, the in-line portion of the daemon would be programmed as follows:

```
struct Lock
{
    int offset;
    int mask
} lock;
int keyTable[MaxNoOfTraces][MaxNoOfDaemons/BitsPerInt];
int index;
int usedIndex;
for(index=0;index<=usedIndex; index++)
{
    if (keyTable[index][lock.offset] & lock.mask)
    {
        daemonDoActivations();
    }
}
{
© 1993 Telefonaktiebolaget LM Ericsson
```

Referring more specifically to FIG. 22, the flow chart showing the key-lock code for multiple traces using the bit-key method is shown starting at 221. A designated daemon is comprised of a offset and mask variable. The offset variable is used to access the corresponding bit-key associated with the designated daemon. The mask variable is used to determine if a designated bit-key will activate the designated daemon. Step one at 222 is to initialize the value of a index variable to zero. Step two at 223 is to compare the value of the index variable to the value of a used-index variable. If the value of the index variable is less than or equal to the value of the used-index variable, the method proceeds to step three at 224. If the value of the index variable is greater than the value of the used-index variable, multiple tracing is stopped at 227. Step three is to compare a activation/deactivation(a/d) bit contained within a bit-key with a mask variable contained within a designated daemon. The comparison is accomplished by using the index variable to access a bit-key associated with a particular trace from a key table ("accessed bit-key"). An offset variable of the designated daemon is then used to access the associated a/d bit within the accessed bit-key ("accessed a/d bit"). If the a/d bit which corresponds to the mask bit in a designated daemon is activated (equals one), the designated daemon is activated at 225 and the method proceeds to step four at 226. If the a/d bit which corresponds to the mask bit in a designated daemon is deactivated (equals zero), the method still proceeds to step four. Step four increments the index variable and proceeds to step two.

In both methods, several tracings may occur simultaneously when the key structure is simply multiplied. This enables several designers working independently to make tracings and even share part of the trace-thread simultaneously. Both methods permit the connection of daemons in one tracing by forming a group of daemons for which one key opens all daemons in the group. Connecting daemons to a common group is one of the most important features of the key-lock methods just described. The grouping makes it possible to trace high-level (application program) events and low-level (operating software) events in the same tracing as shown in FIG. 3B by branches 46a and 46b to determine the ancestry of operating systems events at the application level.

The main advantage of the word method is that the in-line part of the daemon executes faster if the number of daemons is greater than the normal word-length of the processors used. The reason is that such processors generally are optimized for working with words rather than with bits. The main advantage of the bit method, on the other hand, is that information about daemon groups doesn't need to be signalled before the tracing takes place. Thus the bit method is best suited for systems where there is no central administration of the processors in the network, so that the processors forming part of the trace-thread will not be known in advance.

When the networks are too large to know or foresee the number of processors forming part of a trace-thread, and where there is no general method for broadcasting messages, the key as well as the complete qualifications-and-actions list has to be a part of every message that derives from the trace-thread. This would be a serious disadvantage since the traced messages would require more space than other messages, and for that reason the behavior for a traced trace-thread would differ from untraced ones. But for networks, where that type of implementation is necessary, the bit method must be used. If, on the other hand, the participating processors can be informed of a certain tracing in advance, it is easy to transmit the group information as well. In that case the word method is preferred to conserve capacity.

Having described the details of the invention, the operation of the invention is now reviewed, commencing with the trace session which begins as follows:

(1) The designer decides which daemons that should be used for the tracing. When using groups of daemons, depending on whether the implementation requires it, the system adds a group lock to those daemons which are defined to be in the group.

(2) The designer defines the starting point of the trace-thread by using a point-trace.

(3) When the execution passes the starting point the trace-thread identity is assigned by a daemon and the tracing commences.

(4) When the tracing is finished the result is displayed for the designer.

It is believed that the operation and construction of the present invention will be apparent from the foregoing description. While the method, apparatus and system shown and described has been characterized as being preferred, it could be obvious that various changes and modifications may be made without departing from the spirit and scope of the invention as defined by the following claims:

What is claimed is:

1. A method for detecting events occurring in a telecommunications network comprising stored program control (SPC) exchanges, each SPC exchange comprising a switch and processors for executing software programs to control the switch, said method comprising the steps of:

implanting a plurality of daemons in selected portions of the software programs, each of said daemons being operable to perform at least one activity in response to the detection of an event which satisfies a conditional statement contained within said daemon;

assigning a lock value to each of the daemons, each lock value uniquely identifying the corresponding daemon and being operable to activate the processor for executing the daemon in response to a key value being equal to the lock value;

comparing each lock value of each daemon to a key value stored in said SPC exchange for each corresponding daemon and selectively activating the processor to execute said daemon if said lock value of said daemon equals the corresponding key value;

executing the activity specified in said daemon if the detected event satisfies the conditional statement contained within said daemon; and continuing execution of the software program after each activity within an activated daemon is executed whereby continuous-processing in the SPC exchange is maintained.

2. The method of claim 1 wherein each processor comprises a processing unit and memory, and wherein said plurality of daemons are created and implanted in software programs prior to runtime of the SPC exchange according to the following steps:

defining each daemon to include a conditional statement, a responsive activity, and a corresponding lock value;

implanting said daemons in selected portions of the software programs;

compiling the software programs and linking said compiled software programs to said daemons; and loading said compiled software programs linked to said daemons into the memory of the processor for subsequent execution by the processing unit during runtime of the SPC exchange.

3. The method of claim 1 wherein each processor comprises a processing unit and memory, and wherein said plurality of daemons are created and implanted in software programs stored in memory during runtime of the SPC exchange according to the following steps:

defining each daemon to include a conditional statement, a responsive activity and a corresponding lock value;

compiling each daemon and loading each compiled daemon into the memory of the processor; and inserting a trap call in each software program and a corresponding trap return in each daemon, whereby execution by the processing unit jumps from said software program to said daemon and back to sold software program.

4. The method of claim 1 further comprising the steps of:

assigning a second lock value to at least two daemons for uniquely identifying them as a group, the second lock value being operable to activate the processors for executing the daemons in said group in response to a key value being equal to said second lock value;

comparing said second lock value to a key value stored in said SPC exchange corresponding to each daemon group and selectively activating the processors to execute said daemons in the group if said second lock value of said daemon equals the corresponding key value; and executing the activity specified in each daemon of the group if the detected event satisfies the corresponding conditional statement contained within said daemon.

5. The method of claim 1 further comprising the steps of:

comparing each lock value to a second key value stored in said SPC exchange corresponding to each daemon and selectively activating the processor to execute a second daemon if said second key value equals the corresponding lock value; and executing the activity specified in said second daemon if the detected event satisfies the conditional statement contained within said daemon.

6. The method of claim 5 wherein the first and second daemons are the same.

7. The method of claim 1 wherein the key value comprises a word having a predetermined number of bits connected to a message.

8. The method of claim 7 further comprising the steps of:

assigning a second lock value to at least two daemons for uniquely identifying them as a group, the second lock value being operable to activate the processors for executing the daemons in said group in response to a key value being equal to said second lock value;

comparing said second lock value to a key value stored in said SPC exchange corresponding to each daemon group and selectively activating the processors to execute said daemons in the group if said second lock value of said daemon equals the corresponding key value; and executing the activity specified in each daemon of the group if the detected event satisfies the corresponding conditional statement contained within said daemon.

9. The method of claim 8 further comprising the steps of:

comparing each lock value to a second key value stored in said SPC exchange corresponding to each daemon and selectively activating the processor to execute a second daemon if said second key value equals the corresponding lock value; and executing the activity specified in said second daemon if the detected event satisfies the conditional statement contained within said daemon.

10. The method of claim 1 wherein the key value is a bivector comprising a bit pattern and a corresponding set of index numbers for each daemon, and the lock value for each daemon is the corresponding bit in said bit pattern that is operable to activate said daemon based on the logical value of said bit.

11. The method of claim 10 further comprising the steps of:

comparing each lock value to a second key value stored in said SPC exchange corresponding to each daemon end selectively activating the processor to execute a second daemon if said second key value equals the corresponding lock value; and executing the activity specified in said second daemon if the detected event satisfies the conditional statement contained within said daemon.

12. A method for detecting events occurring in a telecommunications network comprising stored program control (SPC) exchanges, each SPC exchange comprising a switch and processors for executing software programs to control the switch, said method comprising the steps of:

implanting daemons in selected portions of the software programs, each daemon including a conditional statement responsive to certain events and at least one activity resulting from the detection of a certain event satisfying the conditional statement;

assigning a lock value to each of the daemons, each lock value uniquely identifying the corresponding daemons and being operable to either activate the processor for executing the daemon or deactivate the processor for bypassing the daemon to continue execution of the software program in response to a key value being equal to the lock value;

comparing a key value to each lock value for selectively activating the processor to execute the daemon when the key value equals the lock value or deactivating the processor to bypass the daemon when the key value does not equal the lock value;

executing the activity specified in the daemon if the detected event satisfies the conditional statement; and continuing execution of the software program after each activity is executed whereby continuous-processing in the SPC exchange is maintained.

13. The method of claim 12 wherein each processor comprises a processing unit and memory, and wherein the daemons are created and implanted in the software program prior to runtime of the SPC exchange according to the following steps:

defining the daemon to include the conditional statement, the resulting activity, and the corresponding lock value;

implanting the daemons in selected portions of the software programs;

compiling the software program and linking the compiled software program to the daemons; and loading the compiled software program linked to the daemons into the memory of the processor for subsequent execution by the processing unit during runtime of the SPC exchange.

14. The method of claim 12 wherein each processor comprises a processing unit and memory, and wherein the daemons are created and implanted in the software program stored in memory during runtime of the SPC exchange according to the following steps:

defining the daemon to include the conditional statement, the resulting activity and the corresponding lock value;

compiling the daemon and loading the compiled daemon into the memory of the processor; and inserting a trap call in the software program and a trap return in the daemon, whereby execution by the processing unit jumps from the software program to the daemon and back to the software program.

15. The method of claim 12 further comprising the steps of:

assigning a second lock value to at least two daemons for uniquely identifying them in a group, the second lock value being operable to either activate the processors for executing the daemons in the group or deactivate the processors for bypassing the daemons in the group and to continue execution of the software program;

comparing the key value to the second lock value for selectively activating the processors to execute the daemons in the group when the key value equals the second lock value or deactivating the processors to bypass the daemon in the group when the key value does not equal the second lock value; and executing the activity specified in each daemon of the group if the detected event satisfies the corresponding conditional statement.

16. The method of claim 12 further comprising the steps of:

comparing a second key value to each lock value for selectively activating the processor to execute a second daemon when the second key value equals the lock value thereof or deactivating the processor to bypass the second daemon when the second key value does not equal the lock value thereof; and executing the activity specified in the second daemon if the detected event satisfies the conditional statement.

17. The method of claim 16 wherein the first and second daemons are the same.

18. The method of claim 12 wherein the key value comprises a word having a predetermined number of bits connected to a message.

19. The method of claim 18 further comprising the steps of:

assigning a second lock value to at least two daemons for uniquely identifying them in a group, the second lock value being operable to either activate the processors for executing the daemons in the group or deactivate the processors for bypassing the daemons in the group and to continue execution of the software program;

comparing the key value to the second lock value for selectively activating the processors to execute the daemons in the group when the key value equals the second lock value or deactivating the processors to bypass the daemons in the group when the key value does not equal the second lock value; and executing the activity specified in each daemon of the group if the detected event satisfies the corresponding conditional statement.

20. The method of claim 19 further comprising the steps of:

comparing a second key value to each lock value for selectively activating the processor to execute a second daemon when the second key value equals the lock value thereof or deactivating the processor to bypass the second daemon when the second key value does not equal the lock value thereof; and executing the activity specified in the second daemon if the detected event satisfies the conditional statement.

21. The method of claim 12 wherein the key value is a bivector comprising a bit pattern and a corresponding set of index numbers for each daemon, and the lock value for each daemon is the corresponding bit in the bit pattern being operable to activate or deactivate based on the state of the bit.

22. The method of claim 21 further comprising the steps of:

comparing a second key value to each lock value for selectively activating the processor to execute a second daemon when the second key value equals the lock value thereof or deactivating the processor to bypass the second daemon when the second key value does not equal the lock value thereof; and executing the activity specified in the second daemon if the detected event satisfies the conditional statement.

23. A method for detecting events occurring in a telecommunications network comprising stored program control (SPC) exchanges, each SPC exchange comprising a switch and a processor for executing software programs to control the switch, said method comprising the steps of:

implanting daemons in selected portions of the software programs, each daemon including a conditional statement responsive to certain events and at least one activity resulting from the detection of a certain event satisfying the conditional statement;

assigning a lock value to at least two daemons for uniquely identifying them in a group, the lock value being operable to either activate the processors for executing the daemons in the group or deactivate the processors for bypassing the daemons in the group to continue execution of the software program in response to a key value being equal to the look value;

comparing a key value to the lock value for selectively activating the processors to execute the daemons in the group when the key value equals the lock value or deactivating the processors to bypass the daemons in the group when the key value does not equal the lock value;

executing the activity specified in each daemon of the group if the detected event satisfies the corresponding conditional statement; and continuing execution of the software program after each activity is executed whereby continuous-processing in the SPC exchange is maintained.

24. The method of claim 23 further comprising the steps of:

comparing a second key value to each lock value for selectively activating another processor to execute a second daemon when the second key value equals the lock value thereof or deactivating the processor to bypass the second daemon when the second key value does not equal the lock value thereof; and executing the activity specified in the second daemon if the detected event satisfies the conditional statement.

25. The method of claim 23 wherein the key value comprises a word having a predetermined number of bits connected to a message.

26. The method of claim 25 further comprising the steps of:

comparing a second key value to each lock value for selectively activating another processor to execute a second daemon when the second key value equals the lock value thereof or deactivating the processor to bypass the second daemon when the second key value does not equal the lock value thereof; and executing the activity specified in the second daemon if the detected event satisfies the conditional statement.

27. An apparatus for detecting events occurring in a telecommunications network comprising stored program control (SPC) exchanges, each SPC exchange comprising a switch and processors for executing software programs to control the switch, said apparatus comprising:

means for implanting a plurality of daemons in selected portions of the software programs, each of said daemons being operable to perform at least one activity in response to the detection of in event which satisfies a conditional statement contained within said daemon;

means for assigning a lock value to each of the daemons, each lock value uniquely identifying the corresponding daemon and being operable to activate the processor for executing the daemon in response to a key value being equal to the lock value;

means for comparing each lock value of each daemon to a key value stored in said SPC exchange for each corresponding daemon and selectively activating the processor to execute the said daemon if said lock value of said daemon equals the corresponding key value;

means for executing the activity specified in the said daemon if the detected event satisfies the conditional statement contained within said daemon; and means for continuing execution of the software program after each activity within an activated daemon is executed whereby continuous-processing in the SPC exchange is maintained.

28. The apparatus of claim 27 wherein each processor comprises a processing unit and memory and wherein said plurality of daemons are created and implanted in software programs prior to runtime of the SPC exchange, further comprising:

means for defining each daemon to include a conditional statement, a responsive activity, and a corresponding lock value;

means for implanting said daemons in selected portions of the software programs;

means for compiling the software programs and linking said compiled software programed to said daemons; and means for loading said compiled software programs linked to said daemons into the memory of the processor for subsequent execution by the processing unit during runtime of the SPC exchange.

29. The apparatus of claim 27 wherein each processor comprises a processing unit and memory and wherein said plurality of daemons are created and implanted in software programs stored in memory during runtime of the SPC exchange, further comprising:

means for defining each daemon to include a conditional statement, a responsive activity and a corresponding lock value;

means for compiling each daemon and loading each compiled daemon into the memory of the processor; and means for inserting a trap call in each software program and a corresponding trap return in each daemon, whereby execution by the processing unit jumps from said software program to said daemon and back to said software program.

30. The apparatus of claim 27 further comprising:

means for assigning a second lock value to at least two daemons for uniquely identifying them as a group, the second lock value being operable to activate the processors for executing the daemons in said group in response to a key value being equal to said second lock value;

means for comparing said second lock value to a key value stored in said SPC exchange corresponding to each daemon group and selectively activating the processors to execute said daemons in the group if said second lock value of said daemon equals the corresponding key value and means for executing the activity specified in each daemon of the group if the detected event satisfies the corresponding conditional statement contained within said daemon.

31. The apparatus of claim 27 further comprising:

means for comparing each lock value to a second key value stored in said SPC exchange corresponding to each daemon and selectively activating the processor to execute a second daemon if said second key value equals the corresponding lock value; and means for executing the activity specified in said second daemon if the detected event satisfies the conditional statement contained within said daemon.

32. The apparatus of claim 31 wherein the first and second daemons are the same.

33. The apparatus of claim 27 wherein the key value comprises a word having a predetermined number of bits connected to a message.

34. The apparatus of claim 33 further comprising the steps of:

means for assigning a second lock value to at least two daemons for uniquely identifying them as a group, the second lock value being operable to activate the processors for executing the daemons in said group in response to a key value being equal to said second lock value;

means for comparing said second lock value to a key value stored in said SPC exchange corresponding to each daemon group and selectively activating the processors to execute said daemons in the group if said second lock value of said daemon equals the corresponding key value; and means for executing the activity specified in each daemon of the group if the detected event satisfies the corresponding conditional statement contained within said daemon.

35. The apparatus of claim 34 further comprising:

means for comparing each lock value to a second key value stored in said SPC exchange corresponding to each daemon and selectively activating the processor to execute a second daemon if said second key value equals the corresponding lock value; and means for executing the activity specified in said second daemon if the detected event satisfies the conditional statement contained within said daemon.

36. The apparatus of claim 27 wherein the key value is a bivector comprising a bit pattern and a corresponding set of index numbers for each daemon, and the lock value for each daemon is the corresponding bit in said bit pattern that is operable to activate said daemon based on the logical value of said bit.

37. The apparatus of claim 36 further comprising:

means for comparing each lock value to a second key value stored in said SPC exchange corresponding to each daemon and selectively activating the processor to execute a second daemon if said second key value equals the corresponding lock value; and means for executing the activity specified in said second daemon if the detected event satisfies the conditional statement contained within said daemon.

38. An apparatus for detecting events occurring in a telecommunications network comprising stored program control (SPC) exchanges, each SPC exchange comprising a switch and processors for executing software programs to control the switch, said apparatus comprising:

means for implanting daemons in selected portions of the software programs, each daemon including a conditional statement responsive to certain events and at least one activity resulting from the detection of a certain event satisfying the conditional statement;

means for assigning a lock value to each of the daemons, each lock value uniquely identifying the corresponding daemons and being operable to either activate the processor for executing the daemon or deactivate the processor for bypassing the daemon to continue execution of the software program in response to a key value being equal to the lock value;

means for comparing a key value to each lock value for selectively activating the processor to execute the daemon when the key value equals the lock value or deactivating the processor to bypass the daemon when the key value does not equal the lock value;

means for executing the activity specified in the daemon if the detected event satisfies the conditional statement; and means for continuing execution of the software program after each activity is executed whereby continuous-processing in the SPC exchange is maintained.

39. The apparatus of claim 38 wherein each processor comprises a processing unit and memory and wherein the daemons are created and implanted in the software program prior to runtime of the SPC exchange, further comprising:

means for defining the daemon to include the conditional statement, the resulting activity, and the corresponding lock value;

means for implanting the daemons in selected portions of the software programs;

means for compiling the software program and linking the compiled software program to the daemons; and means for loading the compiled software program linked to the daemons into the memory of the processor for subsequent execution by the processing unit during runtime of the SPC exchange.

40. The apparatus of claim 38 wherein each processor comprises a processing unit and memory, and wherein the daemons are created and implanted in the software program stored in memory during runtime of the SPC exchange according, further comprising:

means for defining the daemon to include the conditional statement, the resulting activity and the corresponding lock value;

means for compiling the daemon and loading the compiled daemon into the memory of the processor; and means for inserting a trap call in the software program and a trap return in the daemon, whereby execution by the processing unit jumps from the software program to the daemon and back to the software program.

41. The apparatus of claim 38 further comprising:

means for assigning a second lock value to at least two daemons for uniquely identifying them in a group, the second lock value being operable to either activate the processors for executing the daemons in the group or deactivate the processors for bypassing the daemons in the group and to continue execution of the software program;

means for comparing the key value to the second lock value for selectively activating the processors to execute the daemons in the group when the key value equals the second lock value or deactivating the processors to bypass the daemons in the group when the key value does not equal the second lock value; and means for executing the activity specified in each daemon of the group if the detected event satisfies the corresponding conditional statement.

42. The apparatus of claim 38 further comprising:

means for comparing a second key value to each lock value for selectively activating the processor to execute a second daemon when the second key value equals the lock value thereof or deactivating the processor to bypass the second daemon when the second key value does not equal the lock value thereof; and means for executing the activity specified in the second daemon if the detected event satisfies the conditional statement.

43. The apparatus of claim 42 wherein the first and second daemons are the same.

44. The apparatus of claim 38 wherein the key value comprises a word having a predetermined number of bits connected to a message.

45. The apparatus of claim 44 further comprising:

means for assigning a second lock value to at least two daemons for uniquely identifying them in a group, the second lock value being operable to either activate the processors for executing the daemons in the group or deactivate the processors for bypassing the daemons in the group and to continue execution of the software program;

means for comparing the key value to the second lock value for selectively activating the processors to execute the daemons in the group when the key value equals the second lock value or deactivating the processors to bypass the daemons in the group when the key value does not equal the second lock value; and means for executing the activity specified in each daemon of the group if the detected event satisfies the corresponding conditional statement.

46. The apparatus of claim 45 further comprising:

means for comparing a second key value to each lock value for selectively activating the processor to execute a second daemon when the second key value equals the lock value thereof or deactivating the processor to bypass the second daemon when the second key value does not equal the lock value thereof; and means for executing the activity specified in the second daemon if the detected event satisfies the conditional statement.

47. The apparatus of claim 38 wherein the key value is a bivector comprising a bit pattern and a corresponding set of index numbers for each daemon, and the lock value for each daemon is the corresponding bit in the bit pattern being operable to activate or deactivate based on the state of the bit.

48. The apparatus of claim 47 further comprising:

means for comparing a second key value to each lock value for selectively activating the processor to execute a second daemon when the second key value equals the lock value thereof or deactivating the processor to bypass the second daemon when the second key value does not equal the lock value thereof; and means for executing the activity specified in the second daemon if the detected event satisfies the conditional statement.

49. An apparatus for detecting events occurring in a telecommunications network comprising stored program control (SPC) exchanges, each SPC exchange comprising a switch and a processor for executing software programs to control the switch, said apparatus comprising:

means for implanting daemons in selected portions of the software programs, each daemon including a conditional statement responsive to certain events and at least one activity resulting from the detection of a certain event satisfying the conditional statement;

means for assigning a lock value to at least two daemons for uniquely identifying them in a group, the lock value being operable to either activate the processors for executing the daemons in the group or deactivate the processors for bypassing the daemons in the group to continue execution of the software program in response to a key value being equal to the lock value;

means for comparing a key value to the lock value for selectively activating the processors to execute the daemons in the group when the key value equals the lock value or deactivating the processors to bypass the daemons in the group when the key value does not equal the lock value;

means for executing the activity specified in each daemon of the group if the detected event satisfies the corresponding conditional statement; and means for continuing execution of the software program after each activity is executed whereby continuous-processing in the SPC exchange is maintained.

50. The apparatus of claim 49 further comprising:

means for comparing a second key value to each lock value for selectively activating another processor to execute a second daemon when the second key value equals the lock value thereof or deactivating the processor to bypass the second daemon when the second key value does not equal the lock value thereof; and means for executing the activity specified in the second daemon if the detected event satisfies the conditional statement.

51. The apparatus of claim 49 wherein the key value comprises a word having a predetermined number of bits connected to a message.

52. The apparatus of claim 51 further comprising:

means for comparing a second key value to each lock value for selectively activating another processor to execute a second daemon when the second key value equals the lock value thereof or deactivating the processor to bypass the second daemon when the second key value does not equal the lock value thereof; and means for executing the activity specified in the second daemon if the detected event satisfies the conditional statement.

53. In a telecommunication network comprising stored program control (SPC) exchanges, each SPC exchange comprising a switch and one or more processors for controlling said switch, a method for efficiently tracing the execution of one or more software application programs running on said one or more processors, said method comprising the steps of:

creating a plurality of daemons, each of said daemons having a unique identity and comprising computer program instructions including a conditional statement for activating said daemon if a lock value embodied in said daemon is found to match an associated key value;

implanting said plurality of daemons in one or more application programs to render the application programs traceable;

generating key values in response to trace commands received from one or more users of said traceable application programs;

storing said generated key values separately from said traceable application programs in the computer system;

activating selected daemons to selectively trace the execution of said traceable application programs in response to a key value satisfying the conditional statements within each of said daemons;

generating trace information relating to the performance of the application program in response to the activation of said daemons without interrupting execution of the application program; and storing said generated trace information in the computer system.

54. The efficient tracing method of claim 53 wherein said steps of creating a plurality of daemons embodying locks and of implanting said daemons in application programs further comprise the steps of:

generating computer programming instructions to define the nature of the conditional statement within each of said daemons;

inserting each of said generated computer program instructions into selected application programs to render each of to the selected application programs traceable;

compiling each of said traceable application programs;

linking each of said compiled traceable application programs to other application programs and to selected library routines; and loading each of said linked traceable application programs into the memory of the computer system.

55. The efficient tracing method of claim 53 wherein said step of creating a plurality of daemons embodying locks further comprises the steps of:

generating computer programming instructions to define the nature of the conditional statement within each of said daemons;

compiling each of said daemons; and loading each of said compiled daemons into the memory of the computer system.

56. The efficient tracing method of claim 55 wherein said step of implanting said plurality daemons is further performed by inserting trap calls in application programs, whereby the execution of the application programs on the computer system is temporarily interrupted upon reaching said trap call, and supplanted by the execution of a daemon that is invoked by said trap call, till all the computer instructions comprising the invoked daemon have been executed, whereupon the execution of said traceable application programs is resumed.

57. The efficient tracing method of claim 53 wherein one or more of said plurality of daemons, upon activation, are capable of invoking themselves or other daemons.

58. The efficient tracing method of claim 53 wherein said step of creating a plurality of daemons further comprises:

creating a daemon group, each daemon in said daemon group containing a group lock that permits all of the daemons in said daemon group to be activated by a common key.

59. The efficient tracing method of claim 53 wherein said key values further comprise words of standardized length that can activate selected daemons if they satisfy the conditional statements within said daemons.

60. The efficient tracing method of claim 53 wherein said key values further comprise a bit pattern whose length is equal to the total number of daemons within the computer system, each bit in said bit pattern being associated with a unique daemon, and being operable to activate the associated daemon if it contains the logical value "1".

61. The efficient tracing method of claim 53 wherein said step of generating trace information relates to the detection of errors in the application programs.

62. The efficient tracing method of claim 53 wherein said step of generating trace information relates to the accumulation of usage statistics concerning the application programs.

63. The efficient tracing method of claim 53 wherein said step of generating trace information relates to the monitoring of the health and stability of application programs.

64. In a telecommunication network comprising stored program control (SPC) exchanges, each SPC exchange comprising a switch and one or more processors for controlling said switch, a system for efficiently tracing the execution of one or more software application programs running on said one or more processors, said system comprising:

means for creating a plurality of daemons, each of said daemons having a unique identity and comprising computer program to instructions including a conditional statement for activating said daemon if a lock value embodied in said daemon is found to match an associated key value;

means for implanting said plurality of daemons in one or more application programs to render the application programs traceable;

means for generating key values in response to trace commands received from one or more users of said traceable application programs;

means for storing said generated key values separately from said traceable application programs in the computer system;

means for activating selected daemons to selectively trace the execution of said traceable application programs in response to the key value satisfying the conditional statements within each of said daemons;

means for generating trace information relating to the performance of the application program in response to the activation of said daemons without interrupting execution of the application program; and means for storing said generated trace information in the computer system.

65. The efficient tracing system of claim 64 wherein said means for creating a plurality of daemons embodying locks and for implanting said daemons in application programs further comprise:

means for generating computer programing instructions to define the nature of the conditional statement within each of said daemons;

means for inserting each of said generated computer program instructions into selected application programs to render each of the selected application programs traceable;

means for compiling each of said traceable application programs;

means for linking each of said compiled traceable application programs to other application programs and to selected library routines; and means for loading each of said linked traceable application programs into the memory of the computer system.

66. The efficient tracing system of claim 64 wherein said means for creating a plurality of daemons embodying locks further comprises:

means for generating computer programming instructions to define the nature of the conditional statement within each of said daemons;

means for compiling each of said daemons; and means for loading each of said compiled daemons into the memory of the computer system.

67. The efficient tracing system of claim 66 wherein said means for implanting said plurality daemons further comprises trap calls inserted in application programs, whereby the execution of the application programs on the computer system is temporarily interrupted upon reaching said trap call, and supplanted by the execution of a daemon that is invoked by said trap call, till all the computer instructions comprising the invoked daemon have been executed, whereupon the execution of said traceable application programs is resumed.

68. The efficient tracing system of claim 64 wherein one or more of said plurality of daemons, upon activation, are capable of invoking themselves or other daemons.

69. The efficient tracing system of claim 64 wherein said means for creating a plurality of daemons further comprises:

means for creating a daemon group, each daemon in said daemon group containing a group lock that permits all of the daemons in said daemon group to be activated by a common key.

70. The efficient tracing system of claim 64 wherein said key values further comprise words of standardized length that can activate selected daemons if they satisfy the conditional statements within said daemons.

71. The efficient tracing system of claim 64 wherein said key values further comprise a bit pattern whose length is equal to the total number of daemons within the computer system, each bit in said bit pattern being associated with a unique daemon, and being operable to activate the associated daemon if it contains the logical value "1".

* * * * *

UNITED STATES PATENT AND TRADEMARK OFFICE
CERTIFICATE OF CORRECTION

Page 1 of 2

PATENT NO. : 5,471,526
DATED : Nov. 28, 1995
INVENTOR(S) : Linnermark, Nils O.A. et al.

It is certified that error appears in the above-indentified patent and that said Letters Patent is hereby corrected as shown below:

Column 5, line 21   Replace "pool ed"
With --pooled--

Column 10, line 55   Replace "DS,"
With --D5,--

Column 18, line 54   Replace "sold"
With --said--

Column 19, line 54   Replace "end"
With --and--

Column 20, line 63   Replace "daemon"
With --daemons--

Column 22, line 10   Replace "look"
With --lock--

Column 22, line 56   Replace "in"
With --an--

UNITED STATES PATENT AND TRADEMARK OFFICE
CERTIFICATE OF CORRECTION

PATENT NO. : 5,471,526
DATED : Nov. 28, 1995
INVENTOR(S) : Linnermark, Nils O.A. et al.

It is certified that error appears in the above-indentified patent and that said Letters Patent is hereby corrected as shown below:

| | |
|---|---|
| Column 23, line 19 | Replace "programed" With --programs-- |
| Column 28, line 10 | Delete "to" |
| Column 29, line 9 | Delete "to" |

Signed and Sealed this

Nineteenth Day of November, 1996

Attest:

BRUCE LEHMAN

*Attesting Officer*      *Commissioner of Patents and Trademarks*